(12) United States Patent
Lombardi

(10) Patent No.: US 8,585,920 B2
(45) Date of Patent: *Nov. 19, 2013

(54) POLISHING COMPOSITION AND METHOD USING SAME

(76) Inventor: John L. Lombardi, Tucson, AZ (US)

( * ) Notice: Subject to any disclaimer, the term of this patent is extended or adjusted under 35 U.S.C. 154(b) by 26 days.

This patent is subject to a terminal disclaimer.

(21) Appl. No.: 13/297,099

(22) Filed: Nov. 15, 2011

(65) Prior Publication Data

US 2012/0205578 A1    Aug. 16, 2012

Related U.S. Application Data

(63) Continuation-in-part of application No. 12/615,248, filed on Nov. 9, 2009, now Pat. No. 8,057,697.

(51) Int. Cl.
*C09K 13/00* (2006.01)
*C09K 13/02* (2006.01)

(52) U.S. Cl.
USPC .................................. 252/79.1; 252/79.5

(58) Field of Classification Search
USPC ............................. 252/79.1, 79.2
See application file for complete search history.

(56) References Cited

U.S. PATENT DOCUMENTS

| | | | |
|---|---|---|---|
| 3,956,402 A | 5/1976 | Schellenbaum | |
| 4,476,219 A | 10/1984 | Sakanoue et al. | |
| 6,468,137 B1 | 10/2002 | Fang et al. | |
| 8,057,697 B2 * | 11/2011 | Lombardi | 252/79.1 |
| 2003/0064671 A1 | 4/2003 | Pasqualoni et al. | |
| 2003/0194953 A1 | 10/2003 | McClain et al. | |
| 2004/0157535 A1 | 8/2004 | Chaneyalew et al. | |
| 2004/0159050 A1 | 8/2004 | Pasqualoni et al. | |

* cited by examiner

*Primary Examiner* — Roberts Culbert
(74) *Attorney, Agent, or Firm* — Dale F. Regelman; Quarles & Brady LLP

(57) ABSTRACT

A polishing composition, comprising a compound having structure I or salts thereof:

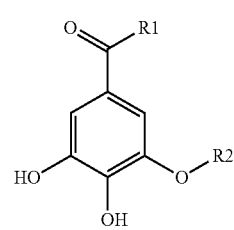

wherein R1 is selected from the group consisting of —O⁻M^{x+} wherein x is selected from the group consisting of 1, 2, and 3, —O—R3 wherein R3 is selected from the group consisting of alkyl, allyl, and phenyl, —N(R3R4) wherein R4 is selected from the group consisting of —H, alkyl, allyl, and phenyl, and —S—R3, and wherein R2 is selected from the group consisting of —CH$_2$—CO$_2$—CH$_3$, —CO—NH—R5, —CH$_2$—CH(OH)—CH$_2$—OH, —CH$_2$—CH(OH)—CH$_2$—R3, and —CH$_2$-substituted phenyl, wherein R5 is selected from the group consisting of alkyl and substituted phenyl.

21 Claims, 44 Drawing Sheets

FIG. 6B

| Identification | Peak (time) | Area% | Height% |
|---|---|---|---|
| I. Methyl Gallate | 14.458 | 98.25% | 87.88% |
| II. 4-MGME | 14.908 | 1.75% | 12.12% |

FIG. 7B

| Identification | Peak (time) | Area% | Height% |
|---|---|---|---|
| I. Methyl Gallate | - | - | - |
| II. 3-MGME | 14.379 | 26.65% | 27.85% |
| III. 4-MGME | 14.874 | 65.25% | 65.48% |
| IV. Di-MGME | 18.158 | 8.10% | 6.67% |

FIG. 7E

| Identification | Peak (time) | Area% | Height% |
|---|---|---|---|
| I. Methyl Gallate | - | - | - |
| II. 3-MGME | 14.384 | 27.96% | 27.23% |
| III. 4-MGME | 14.878 | 64.34% | 67.00% |
| IV. Di-MGME | 18.159 | 7.70% | 5.77% |

FIG. 7H

| Identification | Peak (time) | Area% | Height% |
| --- | --- | --- | --- |
| I. Methyl Gallate | - | - | - |
| II. 3-MGME | 14.388 | 27.02% | 27.74% |
| III. 4-MGME | 14.877 | 62.65% | 62.87% |
| IV. Di-MGME (1) | 17.973 | 6.94% | 5.79% |
| V. Di-MGME (2) | 18.152 | 3.39% | 3.60% |

FIG. 7K

| Identification | Peak (time) | Area% | Height% |
|---|---|---|---|
| I. Methyl Gallate | 14.040 | 29.38% | 18.48% |
| II. 3-MGME | 14.381 | 17.95% | 22.72% |
| III. 4-MGME | 14.875 | 51.40% | 57.12% |
| IV. Di-MGME (1) | 17.805 | 1.27% | 1.68% |
| V. Di-MGME (2) | - | - | - |

FIG. 8B

| Identification | Peak (time) | Area% | Height% |
|---|---|---|---|
| I. Methyl Gallate | 14.048 | 25.38% | 18.78% |
| II. 3-MGME | 14.379 | 8.89% | 5.56% |
| III. 4-MGME | 14.881 | 58.38% | 71.24% |
| IV. Di-MGME (1) | 18.162 | 0.93% | 0.85% |
| V. Di-MGME (2) | - | - | - |
| UNKNOWN | 21.715 | 6.42% | 3.17% |

FIG. 9B

| Identification | Peak (time) | Area% | Height% |
|---|---|---|---|
| I. Methyl Gallate | 14.065 | 100% | 100% |
| II. 3-MGME | - | - | - |
| III. 4-MGME | - | - | - |
| IV. Di-MGME (1) | - | - | - |
| V. Di-MGME (2) | - | - | - |
| VI. Tri-MGME | - | - | - |

FIG. 10B

| Identification | Peak (time) | Area% | Height% |
|---|---|---|---|
| I. Methyl Gallate | 14.388 | 98.03% | 89.43% |
| II. 3-MGME | - | - | - |
| III. 4-MGME | 14.904 | 1.90% | 10.34% |
| IV. Di-MGME (1) | - | - | - |
| V. Di-MGME (2) | - | - | - |
| VI. Unknown | 21.727 | 0.07% | 0.23% |

FIG. 10E

| Identification | Peak (time) | Area% | Height% |
|---|---|---|---|
| I. Methyl Gallate | 14.099 | 57.81% | 36.17% |
| II. 3-MGME | 14.392 | 11.22% | 16.61% |
| III. 4-MGME | 14.908 | 30.48% | 46.55% |
| IV. Di-MGME (1) | 17.812 | 0.10% | 0.13% |
| V. Di-MGME (2) | 18.110 | 0.39% | 0.54% |
| VI. Tri-MGME | - | - | - |

FIG. 10H

| Identification | Peak (time) | Area% | Height% |
|---|---|---|---|
| I. Methyl Gallate | 14.239 | 0.72% | 0.86% |
| II. 3-MGME | 14.380 | 9.75% | 11.70% |
| III. 4-MGME | 14.889 | 63.08% | 72.24% |
| IV. Di-MGME (1) | 17.805 | 3.56% | 2.09% |
| V. Di-MGME (2) | 18.167 | 11.52% | 9.15% |
| VI. Tri-MGME | 27.255 | 11.37% | 3.96% |

FIG. 10K

| Identification | Peak (time) | Area% | Height% |
|---|---|---|---|
| I. Methyl Gallate | 14.230 | 0.31% | 0.38% |
| II. 3-MGME | 14.393 | 7.87% | 9.93% |
| III. 4-MGME | 14.885 | 33.29% | 56.08% |
| IV. Di-MGME (1) | 17.803 | 3.78% | 3.85% |
| V. Di-MGME (2) | 18.169 | 9.28% | 10.61% |
| VI. Tri-MGME | 27.333 | 45.47% | 19.15% |

FIG. 11B

| Identification | Peak (time) | Area% | Height% |
|---|---|---|---|
| I. Methyl Gallate | 14.230 | 0.31% | 0.38% |
| II. 3-MGME | 14.393 | 7.87% | 9.93% |
| III. 4-MGME | 14.885 | 33.29% | 56.08% |
| IV. Di-MGME (1) | 17.803 | 3.78% | 3.85% |
| V. Di-MGME (2) | 18.169 | 9.28% | 10.61% |
| VI. Tri-MGME | 27.333 | 45.47% | 19.15% |

FIG. 11E

| Identification | Peak (time) | Area% | Height% |
|---|---|---|---|
| I. Methyl Gallate | 14.252 | 6.57% | 12.27% |
| II. 3-MGME | 14.407 | 9.41% | 12.42% |
| III. 4-MGME | 14.882 | 23.21% | 38.81% |
| IV. Di-MGME (1) | - | - | - |
| V. Di-MGME (2) | 18.171 | 5.85% | 7.40% |
| VI. Tri-MGME | 27.279 | 54.96% | 29.10% |

POLISHING COMPOSITION AND METHOD USING SAME

CROSS REFERENCE TO RELATED APPLICATIONS

This Application is a Continuation-In-Part and claims priority from a U.S. application Ser. No. 12/615,248 filed Nov. 9, 2009, now U.S. Pat. No. 8,057,697.

FIELD OF THE INVENTION

The invention relates to a composition useful in grinding, cutting, and/or polishing the surface of ceramic and/or metallic objects.

BACKGROUND OF THE INVENTION

Chemical Mechanical Polishing. Chemical Mechanical Planarization, grinding, cutting, and lapping, collectively referred to herein as "polishing," are key manufacturing technologies for shaping various ceramic and metallic materials. Chemical Mechanical Polishing/Planarization is a process of smoothing surfaces with the combination of chemical and mechanical forces. It can be thought of as a hybrid of chemical etching and free abrasive polishing.

After polishing, the sample surface can be treated using chemo-mechanical suspensions of, for example, colloidal silica (0.125 micron) or aluminum oxide (0.3 micron). A slurry suspension comprising one or more abrasives suspended in a polishing composition is pumped continuously over the sample surface.

SUMMARY OF THE INVENTION

A polishing composition is presented, wherein that polishing composition comprises a compound, or salts thereof, having the structure:

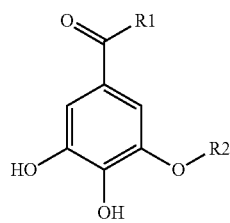

wherein R1 is selected from the group consisting of —O$^-$M$^{x+}$ wherein x is selected from the group consisting of 1, 2, and 3, —O—R3 wherein R3 is selected from the group consisting of alkyl, allyl, and phenyl, —N(R3R4) wherein R4 is selected from the group consisting of —H, alkyl, allyl, and phenyl, and —S—R3, and wherein R2 is selected from the group consisting of —CH$_2$—CO$_2$—CH$_3$, —CO—NH—R5, —CH$_2$—CH(OH)—CH$_2$—OH, —CH$_2$—CH(OH)—CH$_2$—R3, and —CH$_2$-substituted phenyl, wherein R5 is selected from the group consisting of alkyl and substituted phenyl.

A polishing composition formed by a process is presented, wherein the process forms a mixture consisting of methyl chloroacetate, potassium carbonate, and compound having the structure:

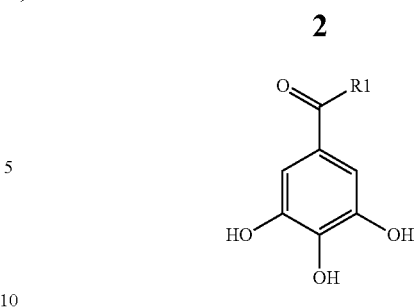

wherein R1 is selected from the group consisting of —O$^-$M$^{x+}$ wherein x is selected from the group consisting of 1, 2, and 3, —O—R3 wherein R3 is selected from the group consisting of alkyl, allyl, and phenyl, —N(R3R4) wherein R4 is selected from the group consisting of —H, alkyl, allyl, and phenyl, and —S—R3.

BRIEF DESCRIPTION OF THE DRAWINGS

The invention will be better understood from a reading of the following detailed description taken in conjunction with the drawings in which like reference designators are used to designate like elements, and in which:

FIG. 6B shows the reaction products for this Example 12;

FIG. 7B shows the reaction products for this embodiment of Example 13;

FIG. 7E shows the reaction products for the embodiment of FIG. 7D of Example 13;

FIG. 7H shows the reaction products for the embodiment of FIG. 7G of Example 13;

FIG. 7K shows the reaction products for the embodiment of FIG. 7J of Example 13;

FIG. 8B shows the reaction products for Example 14;

FIG. 9B shows the reaction products for Example 15;

FIG. 10B shows the reaction products for Example 16;

FIG. 10E shows the reaction products for the embodiment of FIG. 10D of Example 16;

FIG. 10H shows the reaction products for the embodiment of FIG. 10G of Example 16;

FIG. 10K shows the reaction products for the embodiment of FIG. 10J of Example 16;

FIG. 11B shows the reaction products for Example 17;

FIG. 11E shows the reaction products for the embodiment of FIG. 11D of Example 17;

DETAILED DESCRIPTION OF THE PREFERRED EMBODIMENTS

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

As a general matter, the polishing process using Applicant's polishing composition comprises the steps of providing a substrate, where that substrate comprises a target surface, where that target surface may comprise a metal surface, a ceramic surface, a polymeric material, such as for example polycarbonate, or combinations thereof, and the like; providing one or more abrasives; providing Applicant's polishing composition, wherein in certain embodiments the one or more abrasives may be disposed on the polishing/polishing surface; contacting the target surface with Applicant's polishing composition, where in certain embodiments the one or more abrasives may be disposed in Applicant's polishing composition.

Figure 12:
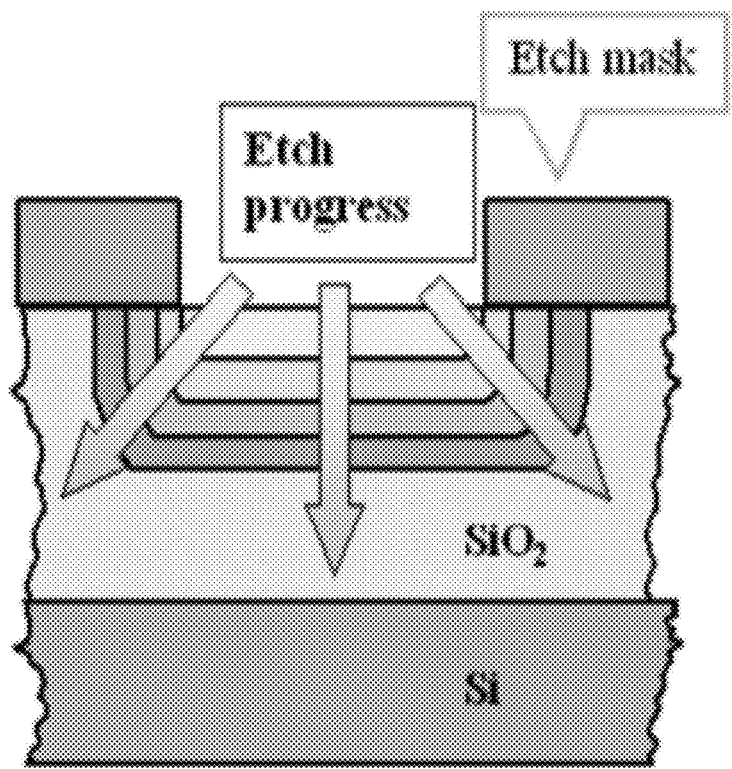
FIG. 12 graphically shows a chemical etch of a metal oxide layer.

In certain embodiments, Applicant's polishing composition is used in combination with chemical etching, for example as shown in FIG. 12 during etching of a metal oxide layer, such as for example and without limitation $SiO_2$.

In certain embodiments, Applicant's polishing composition is utilized during the chemical etching to complex with materials etched away from the substrate. In certain embodiments, Applicant's polishing composition is utilized after completion of the chemical etching to complex with materials etched away from the substrate.

Applicants' polishing composition can also be used in the manufacture of read/write heads for computer hard disks. The following description of Applicant's polishing composition, and uses thereof, is not meant, however, to limit Applicant's invention to the manufacture of such hard disks, or to the manufacture of data storage devices in general, as the invention herein can be applied to surface preparation of metals, ceramics, and the like. In addition, Applicant's compositions are useful in a myriad of applications, including without limitation polishing and/or chemical mechanical polishing of various substrates, manufacture of semiconductor devices, and the like.

As one example, the manufacture of read/write heads for computer hard disks, and the manufacture of the hard disks, includes one or more polishing processes. As those skilled in the art will appreciate, such computer hard disks comprise rotatable disks comprising one or more magnetic materials. Information is written to, and read from, such magnetic disks using a read/write head.

As those skilled in the art will appreciate, computer hard disks are rotatably disposed in a disk drive unit such that the magnetic disk rotates rapidly as information is written thereto and/or read therefrom. In order to prevent the read/write head from damaging the disk surface when that disk is rapidly rotating, it is critical that the read/write head be planarized so that it exhibits minimal surface roughness.

There is an on-going need to maximize the storage density in such computer hard disks. In order to increase that storage density, the fly height between the rotating disk and the read write head is continually decreasing. As a result, increased demands are being placed upon surface quality of both the read-write head and the hard disk.

One such read/write head is often referred to as a Giant Magnetoresistive (GMR) Head. Such GMR Heads comprise a metallized ceramic material. GMR Heads typically comprise TiC-Alumina ceramic, sometimes called "AlTiC," that has been metallized with a variety of ferrous and non-ferrous alloy layers. Prior art GMR Head polishing methods utilize fluids comprising a diamond abrasive dispersed in a mixture of water, various alcohols, and other additives. In order to prevent corrosion of its GMR Head metal layers which would adversely effect the Head's electromagnetic properties and operational performance within the computer hard drive.

These prior art GMR Head polishing methods are inefficient, exhibiting low AlTiC and metallized layer material removal rates (MRR). A low MRR is undesirable from a manufacturing standpoint because the MRR often comprises a rate-limiting step in the production of read/write heads.

In certain embodiments, Applicants' polishing composition comprises water. In other embodiments, Applicants' polishing composition does not comprise water. In certain of those embodiments, Applicants' polishing composition comprises one or more non-aqueous solvents.

In certain embodiments, Applicant's polishing composition comprises one or more substituted gallate moieties, one or more substituted gallamide moieties, and/or one or more substituted gallic acid moieties. In certain embodiments, Applicant's polishing composition further comprises one or more hydrocarbons, petroleum distillates, mineral oils, vegetable oils, esters, alcohols, amines, propylene glycol, ethylene glycol, one or more dipolar aprotic solvents, water, and mixtures thereof. In certain embodiments, Applicant's polishing composition includes one or more amine and/or alkali neutralized salts of gallic acid.

In certain embodiments, Applicant's polishing composition comprises a mixture of a lipophilic alcohol and mineral oil. In certain embodiments, the lipophilic alcohol comprises a Guerbet alcohol. In certain embodiments, Applicant's non-aqueous polishing composition comprises a gallate Guerbet ester, formed for example and without limitation, by reacting gallic acid with a Guerbet alcohol.

Guerbet alcohols are the oldest and best-understood material in the class of compounds, first synthesized by Marcel Guerbet. The reaction sequence, which bears his name, is related to the Aldol Reaction and occurs at high temperatures under catalytic conditions. The product is an alcohol with twice the molecular weight of the starting alcohol minus a mole of water.

In certain embodiments, Applicant's non-aqueous polishing composition comprises 2-butyl-1-octanol and/or 2-hexyl-1-decanol. Alcohols 2-butyl-1-octanol and 2-hexyl-1-decanol were diluted with various amounts of mineral oil. The mass ratios of these solutions varied from 1:2 to 1:10 alcohol to mineral oil. These components were miscible without heating.

In certain embodiments, Applicant's polishing composition comprises hydroxyl substituted benzoic acids. In certain embodiments, Applicant's polishing composition comprises one or more derivatives of gallic acid, compound I.

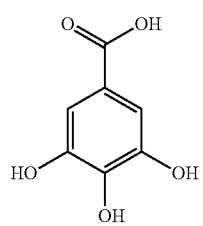

I

In certain of these embodiments, gallic acid-derived materials are dispersed in an aqueous or non-aqueous fluid. Due to the highly acidic nature of gallic acid, Applicant neutralizes the one or more gallic derivatives disposed in Applicant's polishing composition using a variety of amines, alkali hydroxides, choline derivatives, guanidine derivatives. TMAH, prior to use in polishing formulations. Suitable bases include but are not limited to alkanolamines, alkylamines, choline, guanidine derivatives, and the like. Alkaline polishing compositions are desirable to minimize corrosion which may occur during polishing of metallic surfaces. The reaction stoichiometry required to neutralize Applicant's gallic acid embodiments is a function of the pKa of the particular base used.

As a general matter, at least one equivalent of base is used for each equivalent of carboxylic acid available in the one or more substituted gallic acid compounds disposed in the polishing composition. As a further general matter, Applicant has found it desirable to have polishing fluid compositions comprising a pH greater than or equal to 10. As those skilled in the art will appreciate, such a resultant pH may require a two or more molar excess of base with respect to the substituted gallic acid compounds used.

It is known in the chemical arts that gallic acid dimerizes to form Ellagic acid derivatives, Compound III, where R10, R11, R12, and R13, are selected from the group consisting of ammonium salts, alkali metal ions, alkaline earth ions, guanidinium ions, choline cations, and the like.

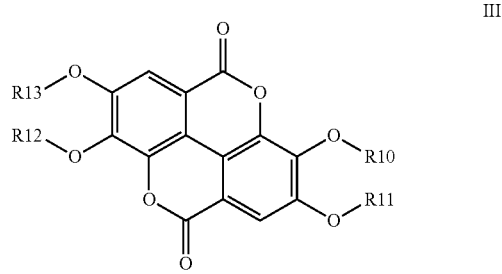

III

In order to eliminate this dimerization of gallic acid-derived compounds, and to generally improve the oxidative stability of Applicant's polishing composition, Applicant synthesized a variety of substituted gallic-acid moieties II. Applicant discovered that blocking one of the three phenolic hydroxyl groups markedly improved the oxidative stability of the polishing composition while maintaining a high MRR rate.

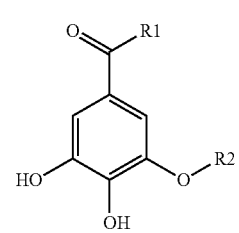

II

Compound IV, a salt of compound II wherein R1 is O—CH$_3$, can effectively complex with metal cations.

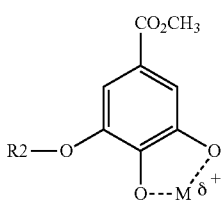

IV

A functionalized gallate derivative II can be prepared using Reaction Scheme I comprising a three step synthetic scheme, wherein two phenol hydroxyl groups are first protected, the remaining phenolic hydroxyl group is alkylated, and then the protective group is removed to generate compound II. Functionalized gallate II can also be prepared using Reaction Scheme II which is described hereinbelow. Reaction Scheme II requires no protecting groups, and in certain embodiments comprises a one step, neat reaction.

A generalized sequence of Reaction Scheme I is shown below using compound II wherein R1 is —O—$CH_3$ and wherein R2 is —$CH_2$—CO—O—$CH_3$.

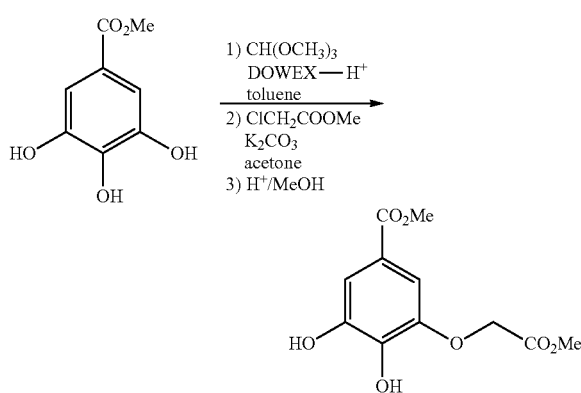

The following examples are presented to further illustrate to persons skilled in the art how to make and use the invention. These examples are not intended as a limitation, however, upon the scope of the invention. These examples utilize methyl gallate V as a starting material. The use of methyl gallate should not be taken as limiting. As a general matter, the Examples recited hereinbelow can be performed using Compound V, as described herein.

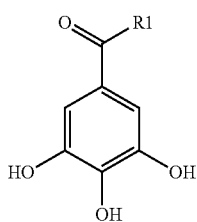

V

Example 1

Methyl gallate, Compound V wherein R1 comprises O—$CH_3$, was esterified in a 1:1 molar stoichiometry with tetramethylorthoformate (TMOF) to form an orthformate protected gallate VI within toluene solvent containing a catalytic amount of Amberlyst polystyrene sulfonic acid catalyst. A toluene-methanol binary azeotrope mixture was then distilled off using a Dean Stark tube. The low boiling point of the toluene-methanol azeotrope enabled the transesterification reaction to be efficiently conducted at low temperatures (ca. 64° C.) which prevented degradation of heat sensitive methyl gallate starting material as well as formation of undesirable side reaction product impurities.

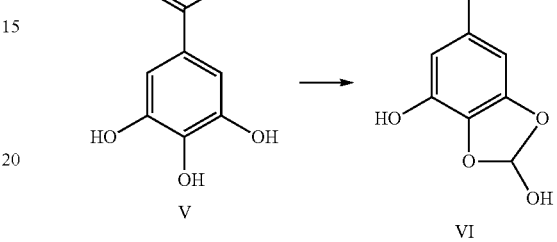

In other embodiments, R1 is selected from the group comprising —N(R3)(R4), and —S—R3, wherein R3 and R4 are independently selected from the group comprising alkyl, allyl, and phenyl.

Example 2

The orthoformate protected gallate VI was then O-alkylated and converted to compound VII after a two hour reaction in refluxing acetone solvent containing ethyl bromoacetate and anhydrous potassium carbonate ($K_2CO_3$). Potassium carbonate was added to neutralize the HBr acid generated, converting it to insoluble potassium bromide (KBr) solid by-product which formed during the gallate O-alkylation reaction.

After refluxing, KBr and residual $K_2CO_3$ solids were filtered from the acetone solution, the acetone solvent was then stripped off using a rotary evaporator and a rose colored solid product VII was collected.

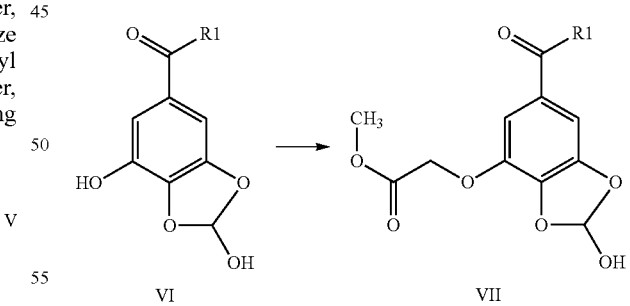

In other embodiments, ethy; choloracetate was used to form product VII. In still other embodiments, the O-alkylation was effected using Cl—$CH_2$—CO—N(R3)(R4). In yet other embodiments, the O-alkylation was effected using Cl—$CH_2$—CO—S—R3.

Example 3

The solid product VII was then dissolved in a dilute solution of sulfuric acid in methanol which was allowed to stand at room temperature for approximately an hour. This removed the orthoformate protection group and yielded alkylated product VIII.

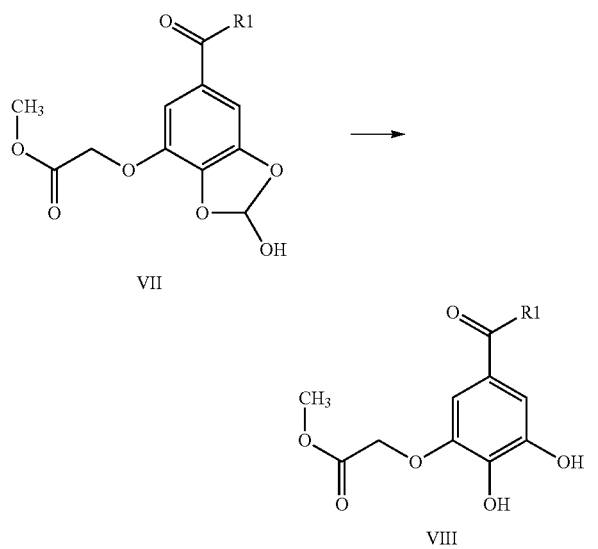

VII

VIII

Example 4

Finally, compound VIII was then hydrolyzed within a dilute acid/methanol solvent to give compound IX.

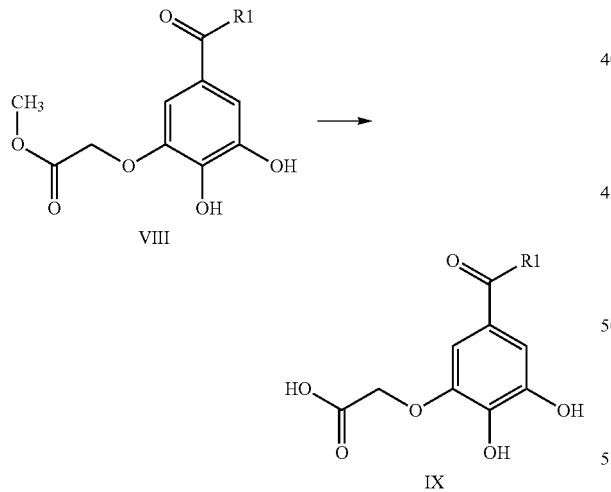

VIII

IX

Applicant treated protected diester VIII with excess dodecyl amine to test the reactivity of the two esters. At elevated temperature in methanol, only the aliphatic amido diol X was observed. Applicant determined that alkyl amide had formed by observing that the $^1$H NMR chemical shift of the methylene group between the methyl ester and aromatic oxygen (Ar—O—CH$_2$—CO$_2$Me) of VIII was 4.8 ppm, while the chemical shift of the methylene group of X (Ar—O—C$\underline{H}_2$—CONHC$_{12}$H$_{25}$) was 4.4 ppm.

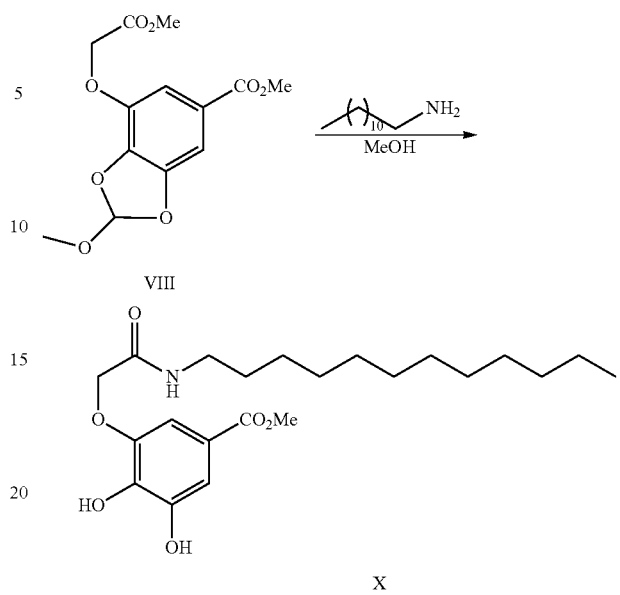

VIII

X

Example 5

A more lipophilic corrosion inhibitor was prepared using lauryl (dodecyl) gallate XI. Using the same sequence of chemistry described hereinabove, protection of lauryl gallate with trimethyl orthoformate provided ester XII in nearly quantitative yield. The protection of lauryl gallate was easier to achieve—likely because of its greater solubility in toluene. Alkylation of XII with α-chloro methyl acetate in the presence of potassium carbonate in acetone gave diester XIII in 86% yield. Removal of the protecting group with DOWEX provided diester diol XIV in nearly quantitative yields.

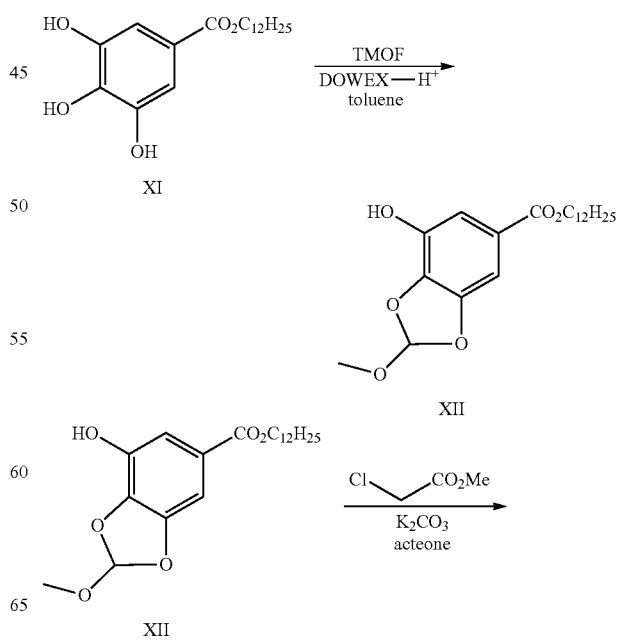

XI

XII

XII

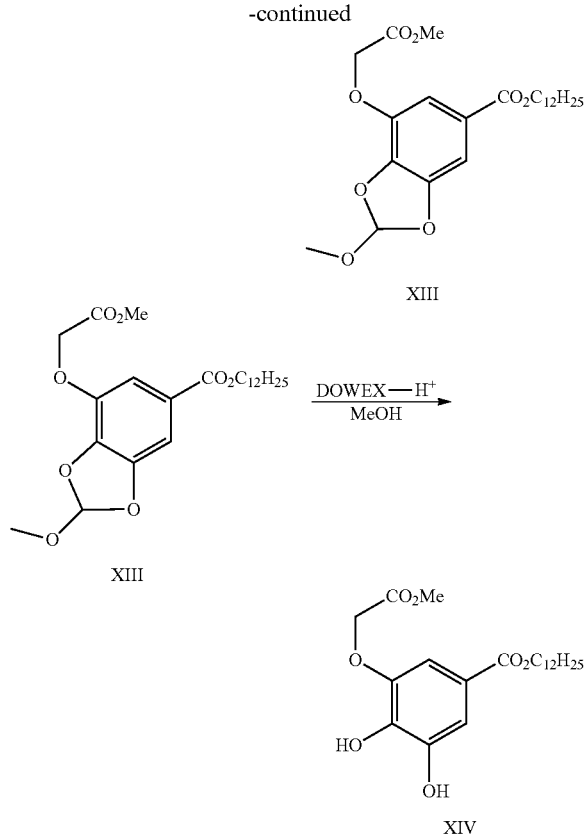

Using diester XIII as an advanced intermediate, Applicant has prepared analogues with various degrees of lipophilicity. For example, amidation of XIII with lauryl (dodecyl)amine in refluxing methanol provided diphenol ester XV.

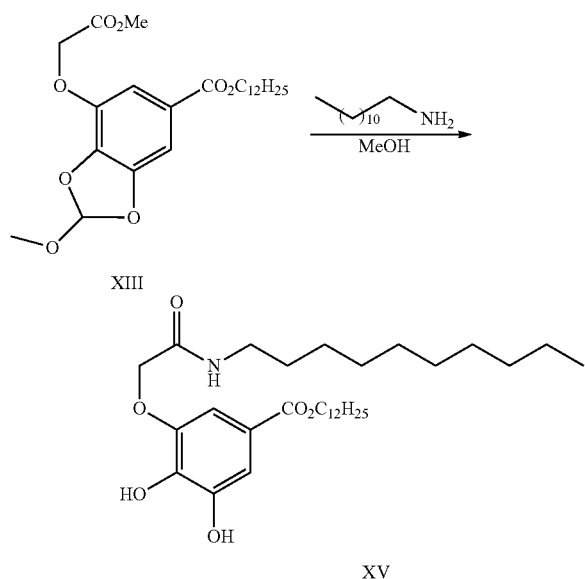

Example 6

Substituted gallate V is reacted with isocynate XVII to form urethane VXIII, wherein R5 can be either alkyl or aromatic. In certain embodiments, isocynate XVII comprises methyl isocyanate. In certain embodiments, isocynate XVII comprises butyl isocyanate. In certain embodiments, isocynate XVII comprises phenyl isocyanate. In certain embodiments, a catalyst such as dibutyl tin dilaurate and the like are used to form urethane adduct XVIII.

In certain embodiments, an equivalent of substituted gallate V is reacted with less than an equivalent of isocyanate XVII such that the reaction product comprises both substituted gallate V and urethane adduct/substituted gallate XVIII. Urethane adduct/substituted gallate XVIII complexes with metal atoms and/or metal ions. A mixture of substituted gallate V and urethane adduct/substituted gallate XVIII complexes with metal atoms and/or metal ions.

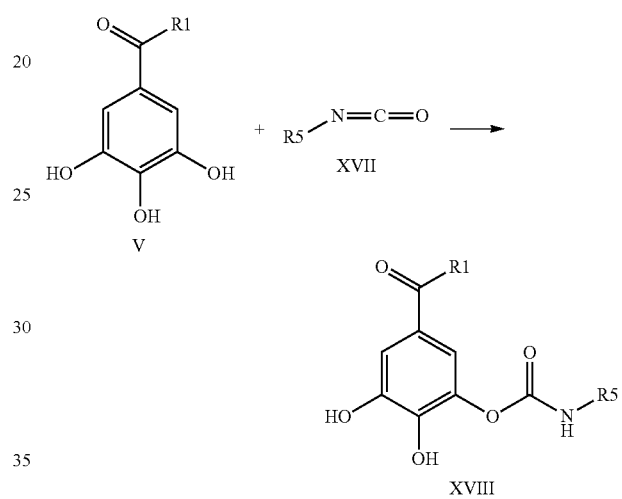

Example 7

Substituted gallate V is reacted with diisocynate XIX to form bis-urethane XX. In certain embodiments, diisocynate XVII comprises hexamethylene diisocyanate. In certain embodiments, diisocynate XVII comprises toluene diisocyanate. In certain embodiments, diisocynate XVII comprises methylene diphenyl diisocyanate. In certain embodiments, a catalyst such as dibutyl tin dilaurate and the like are used to form urethane adduct XVIII.

In certain embodiments, an equivalent of substituted gallate V is reacted with less than an equivalent of isocyanate XVII such that the reaction product comprises both substituted gallate V, bis-urethane adduct/substituted gallate XX, and oligomers of bis-urethane adduct/substituted gallate XX. Bis-urethane adduct/substituted gallate XX complexes with metal atoms and/or metal ions. A mixture of substituted gallate V and bis-urethane adduct/substituted gallate XX complexes with metal atoms and/or metal ions. A mixture of substituted gallate V, bis-urethane adduct/substituted gallate XX, and oligomers of bis-urethane adduct/substituted gallate XX, complexes with metal atoms and/or metal ions.

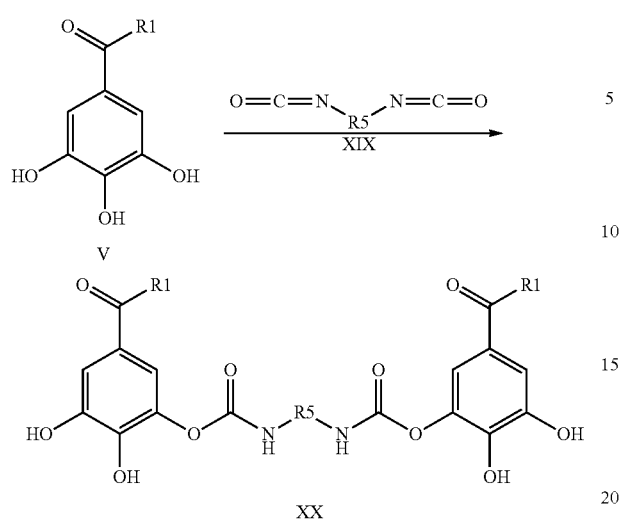

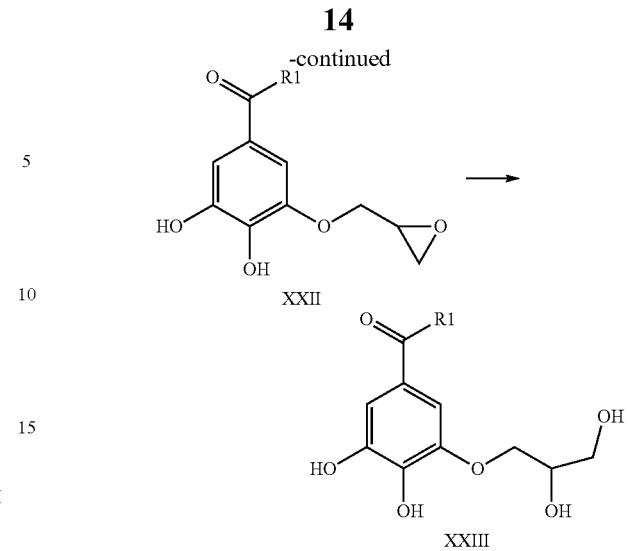

Example 8

Substituted gallate V is reacted with epichlorohydrin XXI to form ether/epoxide adduct/substituted gallate XXII. Those skilled in the art will appreciate that the leaving group X may comprise functionality other halide, such as tosylate and the like. Reaction of ether/epoxide XXII with water gives ether/diol adduct/substituted gallate XXIII.

In certain embodiments, an equivalent of substituted gallate V is reacted with less than an equivalent of epichlorohydrin XXI such that the reaction product comprises both substituted gallate V and ether/epoxide adduct/substituted gallate XXII. Ether/epoxide adduct/substituted gallate XXII complexes with metal atoms and/or metal ions. A mixture of substituted gallate V and ether/epoxide adduct/substituted gallate XXII complexes with metal atoms and/or metal ions.

Ether/diol adduct/substituted gallate XXIII complexes with metal atoms and/or metal ions. A mixture of substituted gallate V and ether/diol adduct/substituted gallate XXIII complexes with metal atoms and/or metal ions. A mixture of substituted gallate V, ether/epoxide adduct/substituted gallate XXII, and ether/diol adduct/substituted gallate XXIII, complexes with metal atoms and/or metal ions. A mixture of ether/epoxide adduct/substituted gallate XXII and ether/diol adduct/substituted gallate XXIII, complexes with metal atoms and/or metal ions.

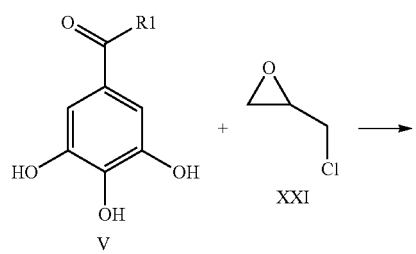

Example 9

Substituted gallate V is reacted with substituted epoxide XXIV to give ether/hydroxyl adduct/substituted gallate XXV, wherein R3 is not a halide. In certain embodiments, an equivalent of substituted gallate V is reacted with less than an equivalent of substituted epoxide XXIV such that the reaction product comprises both substituted gallate V and ether/hydroxyl adduct/substituted gallate XXV. Ether/hydroxyl adduct/substituted gallate XXV complexes with metal atoms and/or metal ions. A mixture of substituted gallate V and ether/hydroxyl adduct/substituted gallate XXV complexes with metal atoms and/or metal ions.

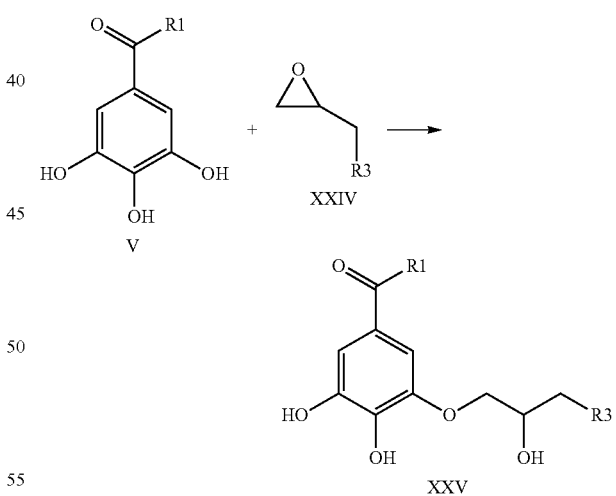

Example 10

Substituted gallate V is reacted with substituted benzyl halide XXVI to give substituted benzyl adduct/substituted gallate XXVII. Those skilled in the art will appreciate that the leaving group X may comprise functionality other halide, such as tosylate and the like.

In certain embodiments, an equivalent of substituted gallate V is reacted with less than an equivalent of substituted benzyl halide XXVI such that the reaction product comprises both substituted gallate V and substituted benzyl adduct/substituted gallate XXVII. Substituted benzyl adduct/substituted gallate XXVII complexes with metal atoms and/or metal ions. A mixture of substituted gallate V and substituted benzyl adduct/substituted gallate XXVII complexes with metal atoms and/or metal ions.

halide XXVIII such that the reaction product comprises both substituted gallate V, bis-ether adduct/substituted gallate XXIX, and oligomers of bis-ether adduct/substituted gallate XXIX. Bis-ether adduct/substituted gallate XXIX complexes with metal atoms and/or metal ions. A mixture of substituted gallate V and bis-ether adduct/substituted gallate XXIX complexes with metal atoms and/or metal ions. A mixture of substituted gallate V, bis-ether adduct/substituted gallate XXIX, and oligomers of bis-ether adduct/substituted gallate XXIX, complexes with metal atoms and/or metal ions.

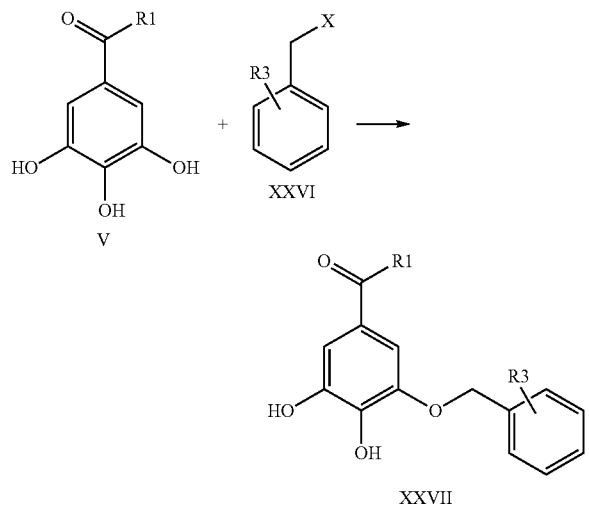

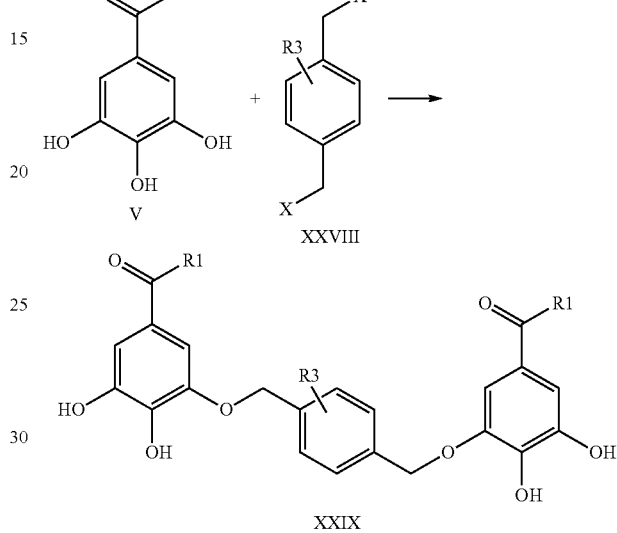

Example 11

Substituted gallate V is reacted with substituted bis-benzyl halide XXVIII to form bis-ether adduct/substituted gallate XXIX. Those skilled in the art will appreciate that the leaving group X may comprise functionality other halide, such as tosylate and the like.

In certain embodiments, an equivalent of substituted gallate V is reacted with less than an equivalent of bis-benzyl A series of reactions were performed following the general Reaction Scheme II. A number of variables were examined, including: temperature, time and concentration. Most reactions were examined neat, i.e. with no solvent, but in a few cases, a solvent was utilized as well.

REACTION SCHEME II

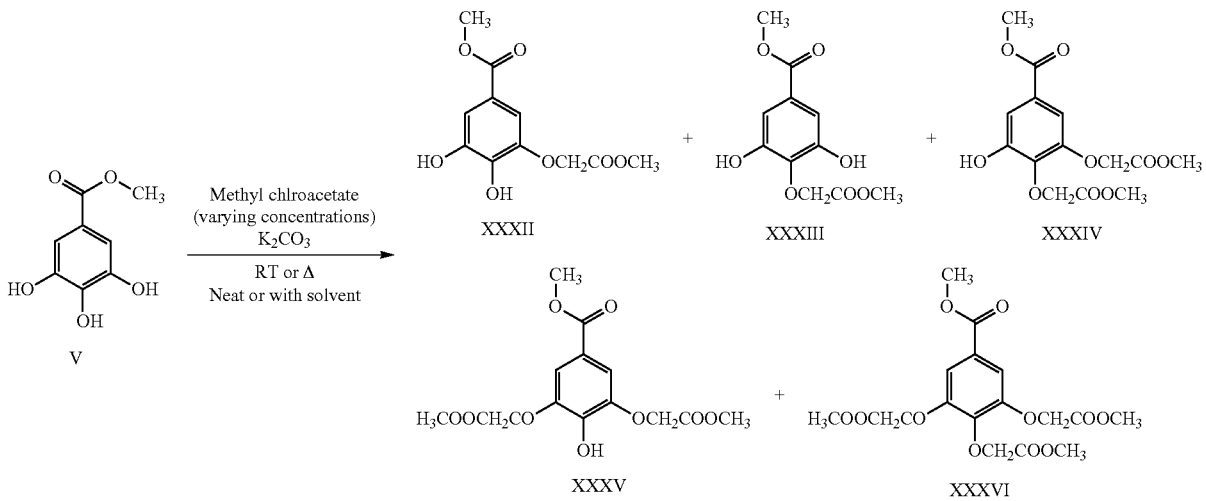

The progress of the reactions was periodically monitored by GC-MS. Small samples were withdrawn from the reaction vessels and filtered through a Pasteur pipette (which had a cotton plug and ~1 cm thick plug of silica gel) prior to injecting into the GC-MS. Initially only ethyl acetate was used as a solvent for passing through the filtration, but eventually an ethyl acetate/acetone mixture was utilized in order to monitor the consumption of methyl gallate, which is more soluble in acetone then ethyl acetate.

Many of the experimental products undergo rearrangement in the GC-MS, most likely at the injection port which is set to 250° C. Table 1 shows many of the rearrangements of the products and the m/z of the products as seen in the GC-MS results.

TABLE 1

Rearrangements and m/z of Products

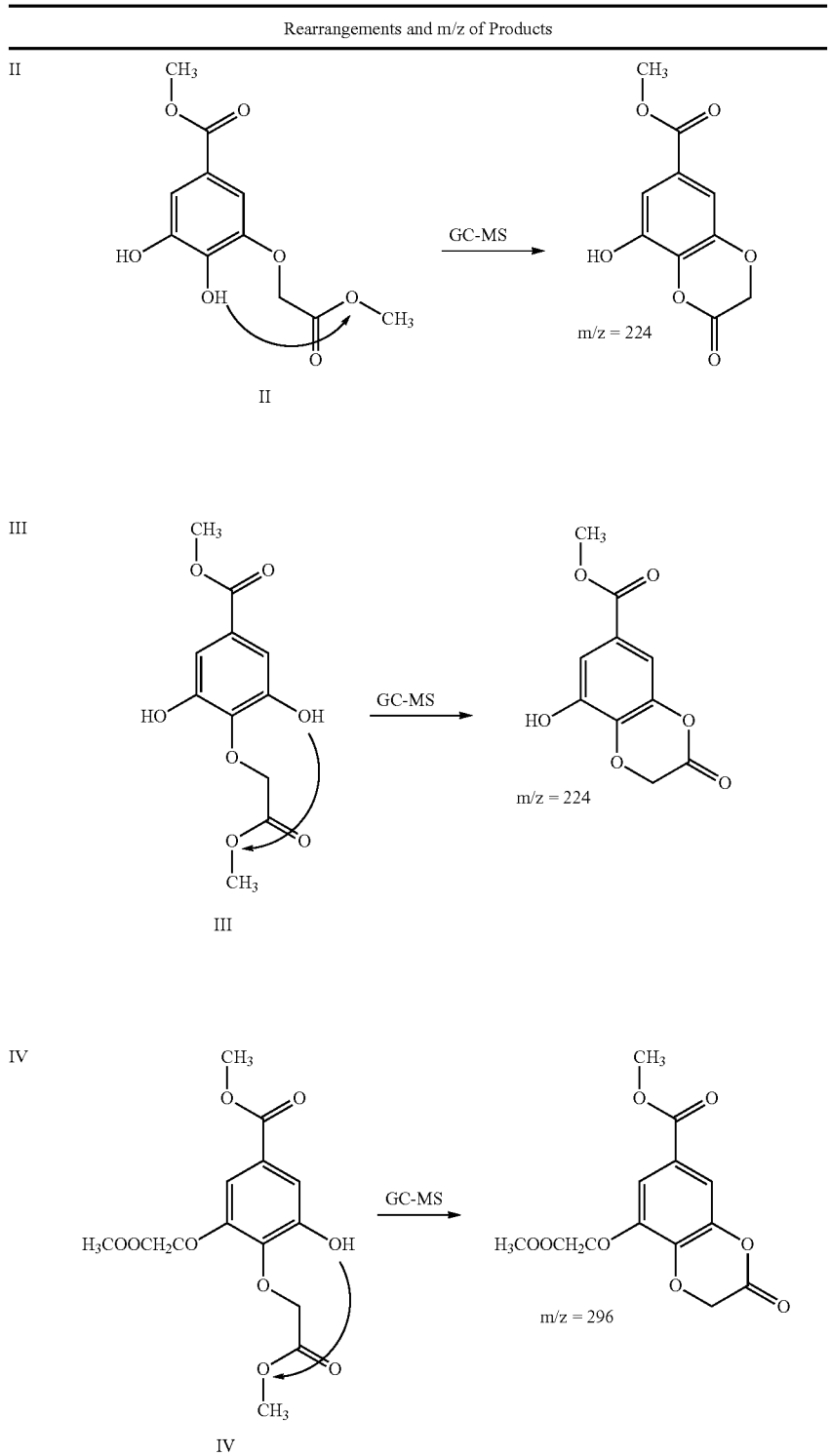

TABLE 1-continued

Rearrangements and m/z of Products

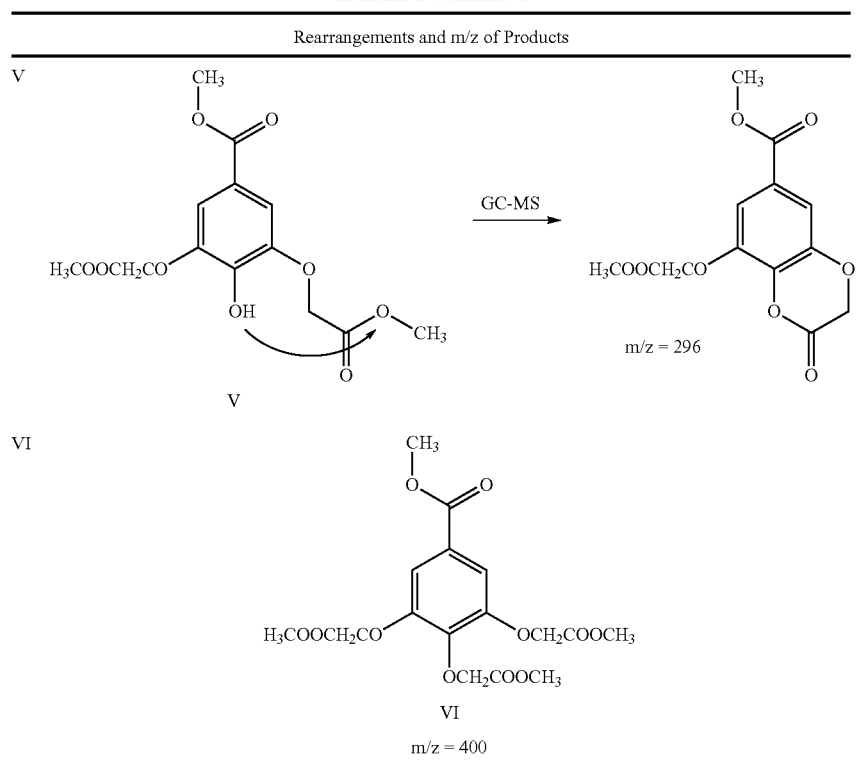

Example 12

In a test tube, 0.32 g of methyl gallate (1.74 mmol), 0.24 g of potassium carbonate (1.74 mmol) and 0.43 g of methyl chloroacetate (3.96 mmol) was added and mixed with a vortexer. The mixture underwent a combination of heating with a heat gun and mixing on the vortexer, at full speed, over a period of about 5 minutes. Ethyl acetate was added to the mixture, it was mixed again, and then a small sample was removed and filtered before injecting in the GC-MS (results follow). The GC-MS indicated a mixture of methyl gallate (98.25%) and 4-MGME (1.75%); however, this indicated that it is possible to form the MGME product reasonably fast under neat conditions.

Figure 6A:
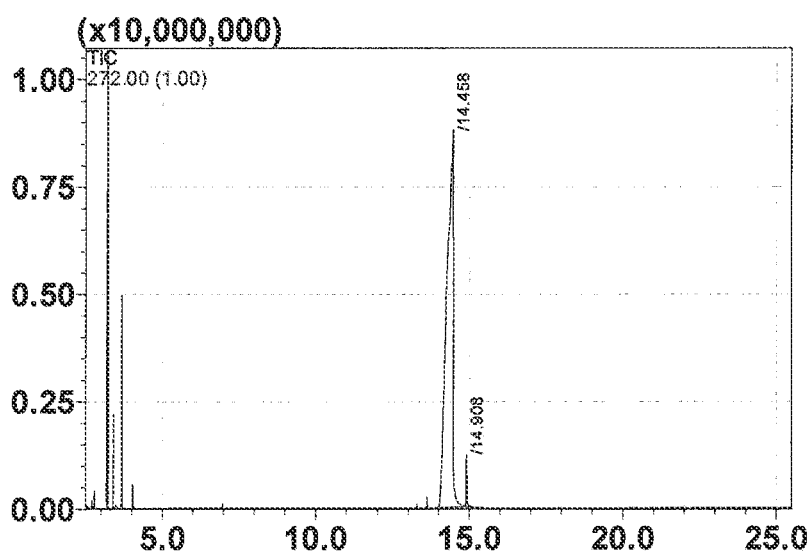
FIG. 6A graphically shows a GC spectrum for the reaction products of Example 12.
Figure 6C:
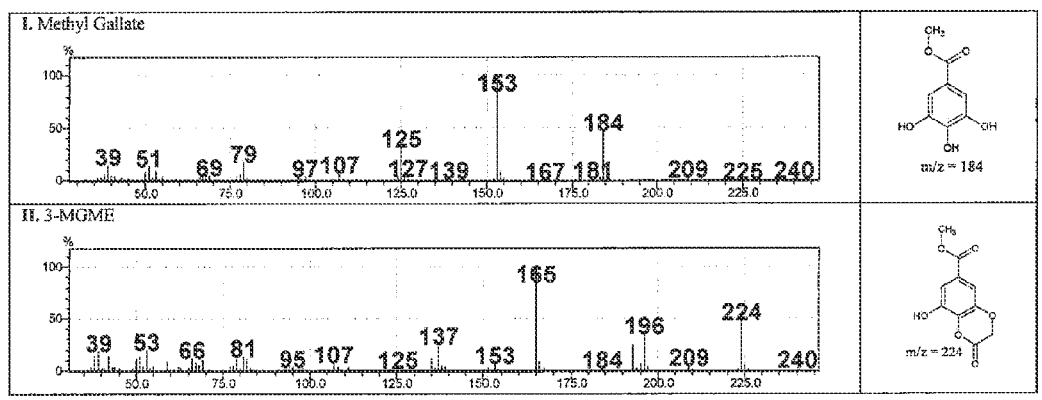
FIG. 6C shows a GC/MS spectrum for the reaction products of this Example 12.

FIG. 6A shows a GC spectrum for the reaction products of this Example 12. FIG. 6B shows the reaction products for this Example 12. FIG. 6C shows a GC/MS spectrum for the reaction products of this Example 12.

Example 13

In a 100 mL round bottom flask, the following was added: 2.32 g of methyl gallate (12.6 mmol), 1.91 g of potassium carbonate (13.8 mmol) and 6.66 g of methyl chloroacetate (6.14 mmol). This solution was heated to a gentle reflux, starting at 14:00. By 14:30 the reaction was gumming up, so ethyl acetate was added and the heat was turned off. A small sample of the solution was filtered and then checked by GC-MS. The GC-MS indicated complete consumption of the methyl gallate and a mixture of three products, the 3- and 4-MGME and a di-substituted MGME product.

Since the methyl gallate is not readily soluble in ethyl acetate, a second sample was taken, mixed and briefly heated with a mixture of ethyl acetate and acetone, filtered and then examined by GC-MS. This GC-MS run agreed with the first in the consumption of methyl gallate.

The main product mixture, still in warm ethyl acetate, was then filtered hot. The filtrate was transferred to a round bottom flask and the solvent was stripped off 0.98 g of a brownish-yellow liquid was obtained, which is well below an estimated yield of 3.31 g (based on different MW of resulting compounds). A small sample of this was dissolved in ethyl acetate/acetone, filtered for good measure, and then checked by GC-MS. There was still no methyl gallate indicated, but a new di-substituted product did appear in this GC-MS.

The solid retentate was dissolved is water/ethyl acetate, heated slightly. The extraction media was cooled back to RT before dipping it in a dry ice bath in order to freeze out the water. The solution was then filtered and the solvent was removed using a rotary evaporator. Only 0.3 g of additional material was obtained. GC-MS (GC-MS Results #5) results indicated some methyl gallate (29.38% by peak area).

Figure 7A:
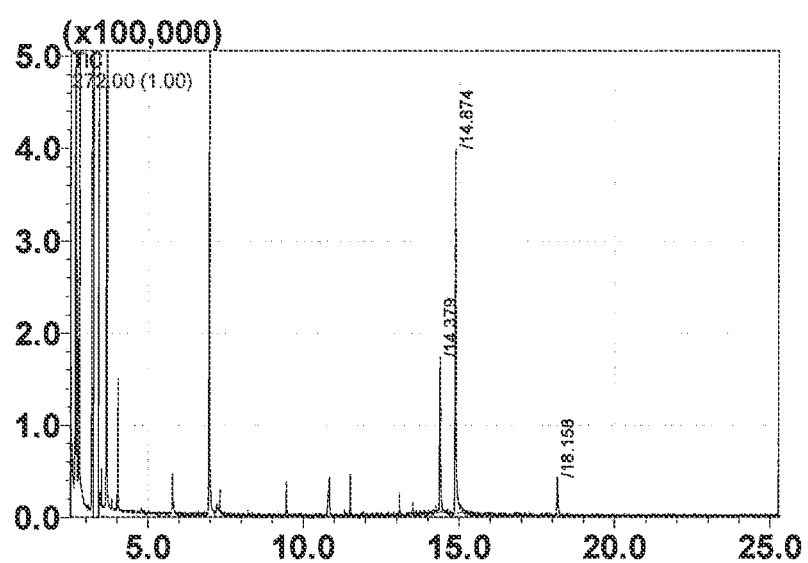
FIG. 7A shows a GC spectrum for the reaction products extracted with ethyl acetate in Example 13.
Figure 7C:
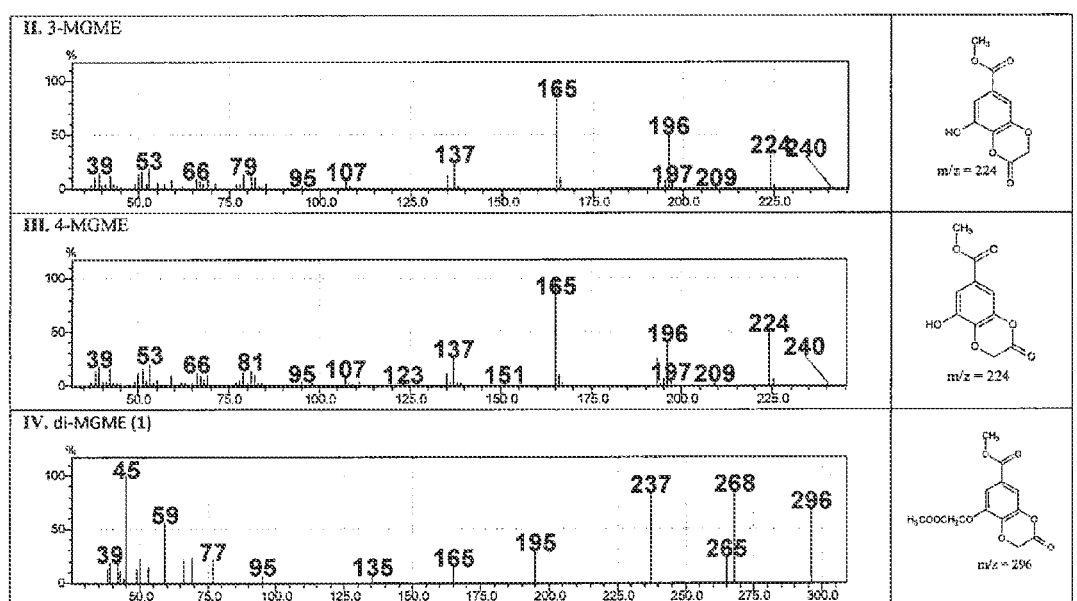
FIG. 7C shows a GC/MS spectrum for the reaction products of this embodiment of Example 13.

FIG. 7A shows a GC spectrum for the reaction products extracted with ethyl acetate in this Example 13. FIG. 7B shows the reaction products for this embodiment of Example 13. FIG. 7C shows a GC/MS spectrum for the reaction products of this embodiment of this Example 13.

Figure 7D:
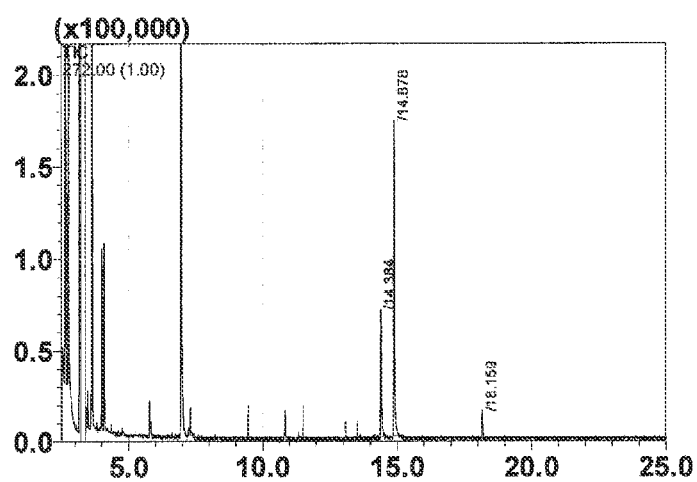
FIG. 7D shows a GC spectrum for the reaction products extracted with ethyl acetate and acetone in Example 13.
Figure 7F:
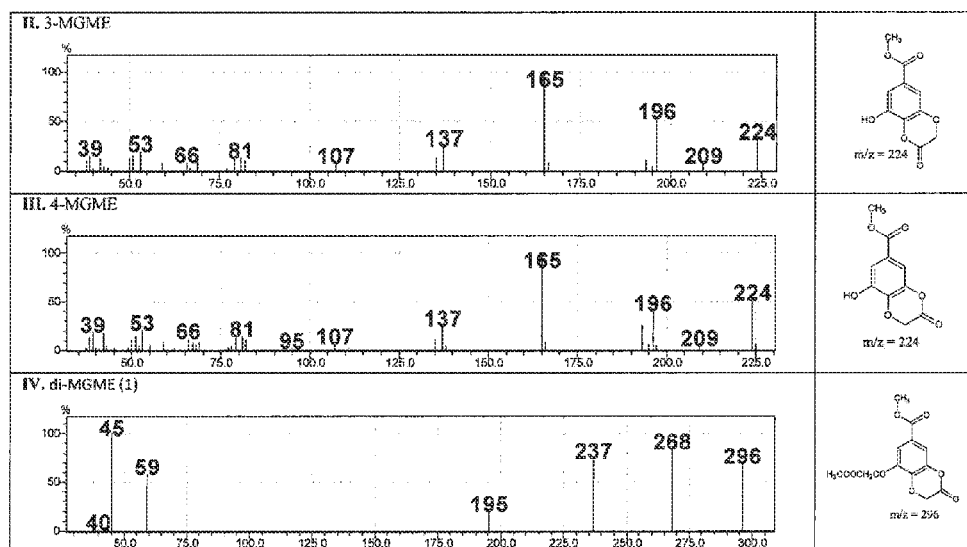
FIG. 7F shows a GC/MS spectrum for the reaction products for the embodiment of FIG. 7D of Example 13.

FIG. 7D shows a GC spectrum for the reaction products extracted with ethyl acetate and acetone in this Example 13. FIG. 7E shows the reaction products for this embodiment of Example 13. FIG. 7F shows a GC/MS spectrum for the reaction products of this embodiment of this Example 13.

Figure 7G:
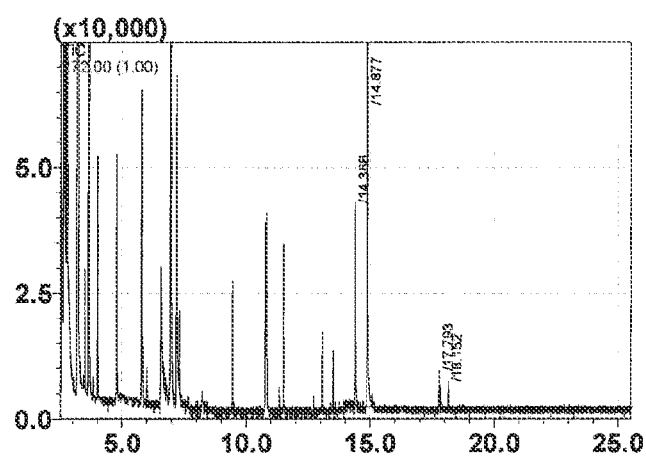
FIG. 7G shows a GC spectrum for the reaction products extracted with ethyl acetate and acetone following an organic workup in Example 13.
Figure 7I:
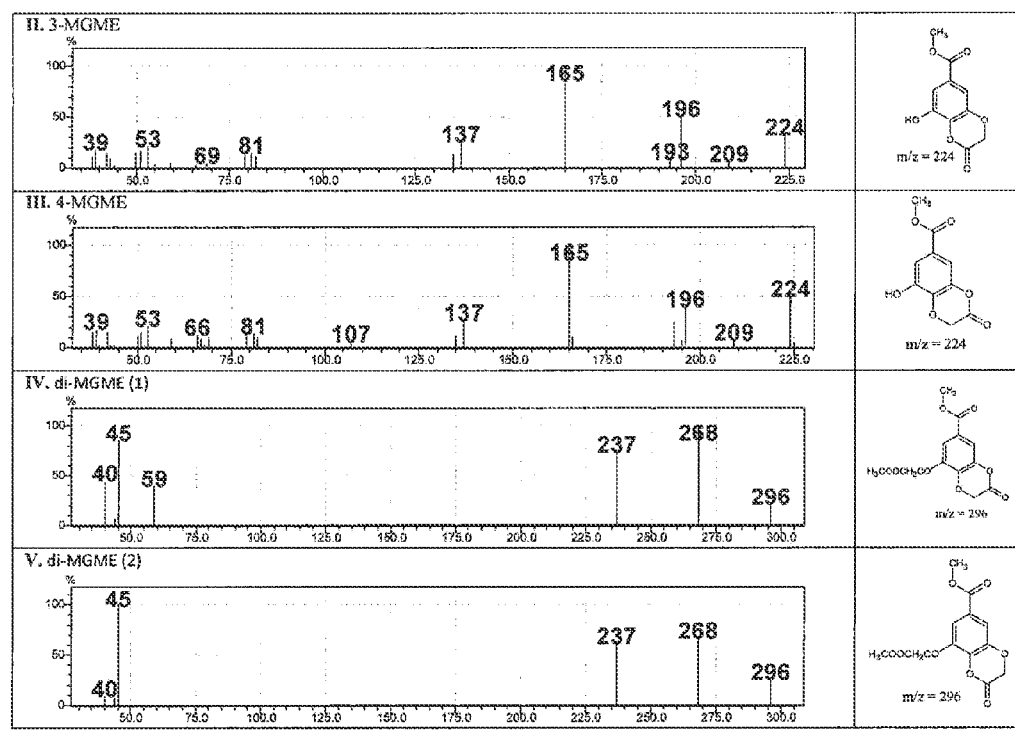
FIG. 7I shows a GC/MS spectrum for the reaction products for the embodiment of FIG. 7G of Example 13.

FIG. 7G shows a GC spectrum for the reaction products extracted with ethyl acetate and acetone following an organic workup in this Example 13. FIG. 7H shows the reaction products for this embodiment of this Example 13. FIG. 7I shows a GC/MS spectrum for the reaction products of this embodiment of this Example 13.

Figure 7J:
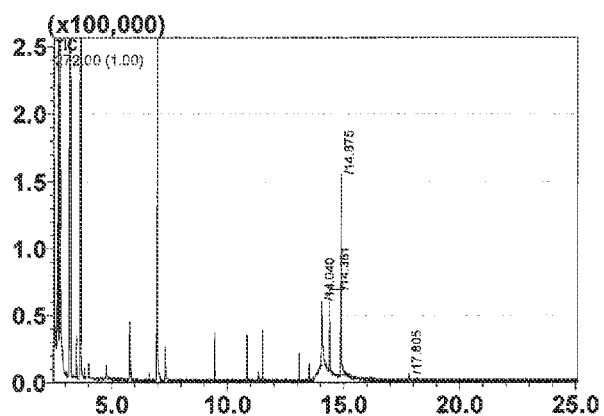
FIG. 7J shows a GC spectrum for the reaction products extracted with ethyl acetate and acetone following an organic workup in Example 13.
Figure 7L:
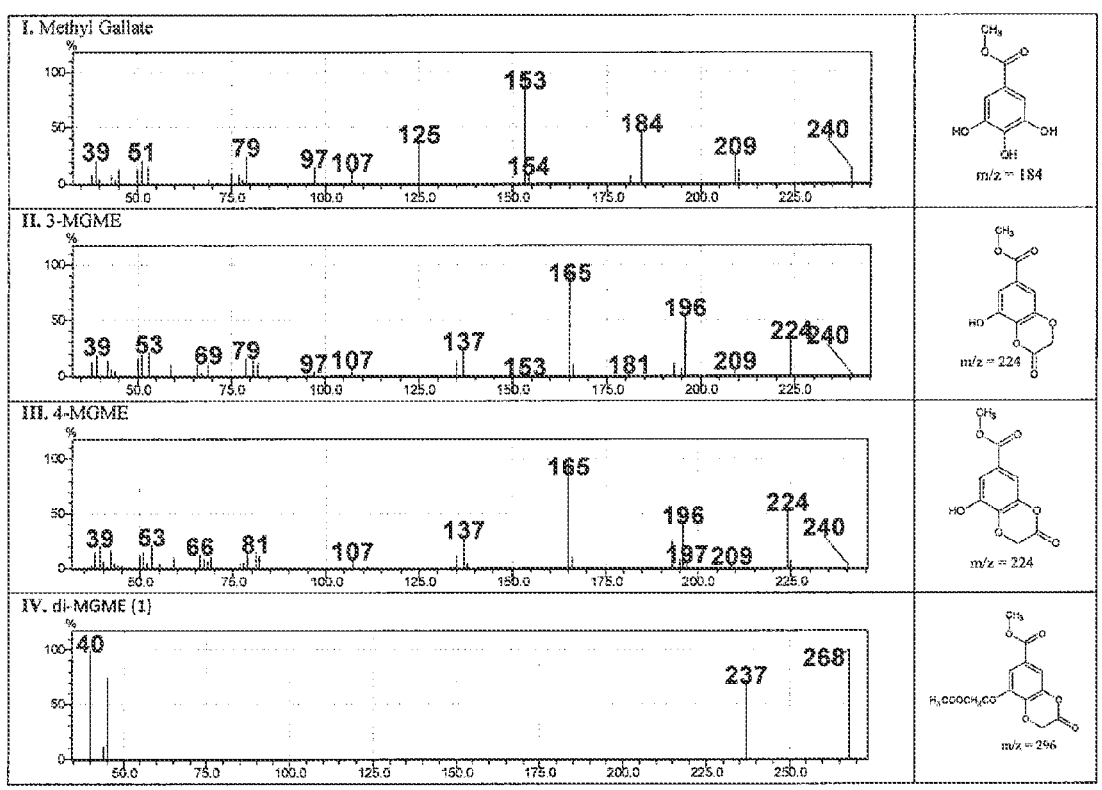
FIG. 7L shows a GC/MS spectrum for the reaction products for the embodiment of FIG. 7J of Example 13.

FIG. 7J shows a GC spectrum for the reaction products extracted with ethyl acetate and acetone following an organic workup in this Example 13. FIG. 7K shows the reaction products for this embodiment of this Example 13. FIG. 7L shows a GC/MS spectrum for the reaction products of this embodiment of this Example 13.

Example 14

In a 100 mL round bottom flask, the following was added: 2.80 g of methyl gallate (15.2 mmol), 2.38 g of potassium carbonate (17.2 mmol) and 23.70 g of methyl chloroacetate (218.4 mmol). This solution was stirred at room temperature over the weekend. The next week, a small sample was removed and mixed with ethyl acetate/acetone and then filtered before checking by GC-MS. The GC-MS indicated that all but about 25% of the methyl gallate was consumed. There was also an additional unknown product, which was addressed above, which appeared on this chromatogram.

Figure 8A:
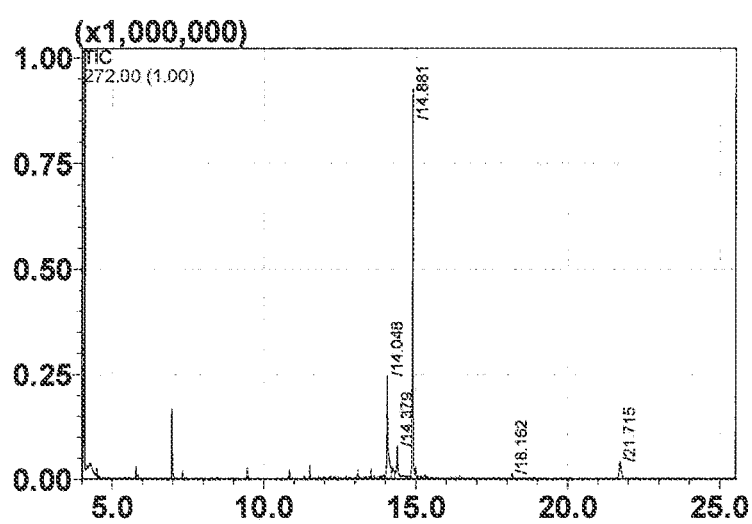
FIG. 8A shows a GC spectrum for the reaction products in Example 14.
Figure 8C:
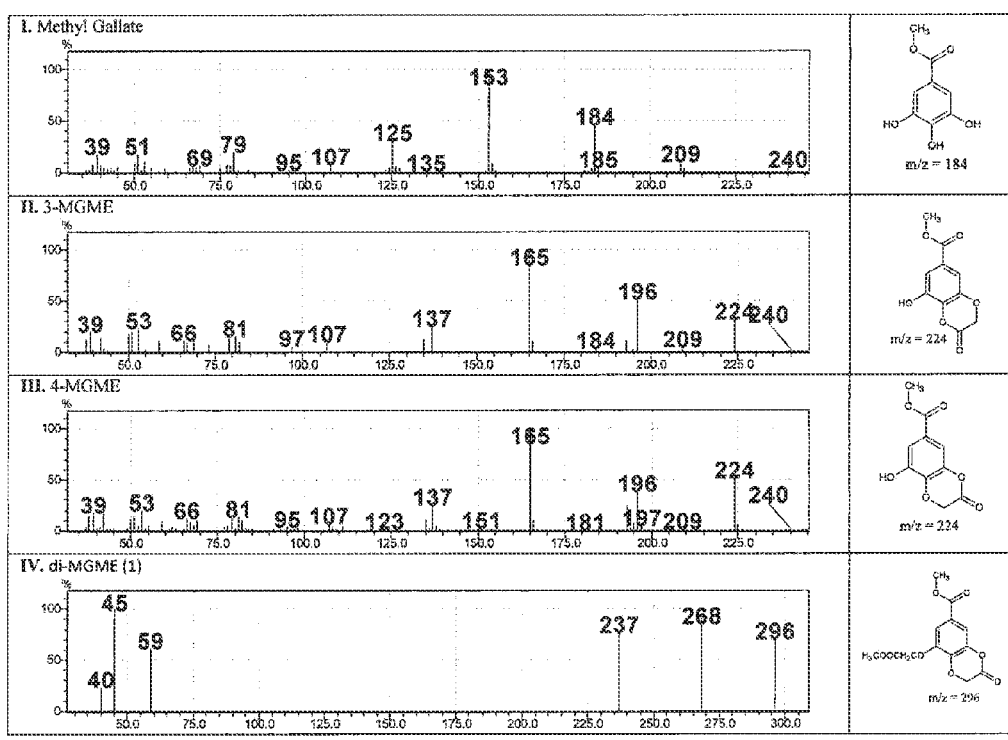
FIG. 8C shows a GC/MS spectrum for the reaction products of Example 14.

FIG. 8A shows a GC spectrum for the reaction products in this Example 14. FIG. 8B shows the reaction products for this Example 14. FIG. 8C shows a GC/MS spectrum for the reaction products of this Example 14.

Example 15

In a test tube, the following was added: 0.71 g of methyl gallate (3.86 mmol), 0.56 g of potassium carbonate (4.05 mmol), 2.38 g of methyl chloroacetate (21.9 mmol) and 1.07 g of acetone (18.4 mmol). This solution was mixed on the vortexer periodically for a total mixing time of about 40 minutes, then a small sample was withdrawn and filtered and checked by GC-MS. The GC-MS indicated 100% methyl gallate.

Figure 9A:
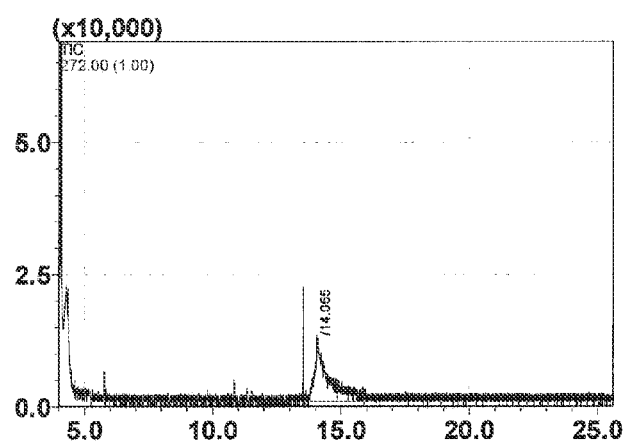
FIG. 9A shows a GC spectrum for the reaction products of Example 15.

FIG. 9A shows a GC spectrum for the reaction products of this Example 15. FIG. 9B shows the reaction products for this Example 15.

Example 16

In a 50 mL round bottom flask, the following was added: 1.91 g of methyl gallate (10.4 mmol), 1.80 g of potassium carbonate (13.0 mmol), 8.24 g of methyl chloroacetate (75.9 mmol) and 2.26 g of acetone (38.9 mmol). The solution was heated slowly and the temperature was determined with an IR temperature gun. Small samples were occasionally withdrawn and filtered and checked by GC-MS. The first hour the temperature stayed around 35° C. The GC-MS results showed very little product formation. The second hour the temperature was ramped up to about 55-70° C. The GC-MS results indicated a good increase in the MGME products, including the di-substituted products. The reaction was cooled to room temperature and stirred overnight; it was heated back to about 55° C. for about one more hour the next morning, by this time it was becoming too thick to stir. The GC-MS indicated consumption of most of the methyl gallate and production of some tri-substituted MGME.

Ethyl acetate was added to the mixture and it was mixed warm for about 20 minutes before filtrating to remove the solid (vacuum filtration). Hexanes were then added to the filtrate until it turned cloudy. The Erlenmeyer flask was placed in an ice bath and the solution was mixed for about an hour as solid precipitate crashed out. The solution was filtered and the solid was collected and dissolved in ethyl acetate. It did not go into solution very well. A small sample was removed and filtered and checked by GC-MS. The GC-MS results indicated that most of the product collected was the tri-substituted MGME.

Figure 10A:
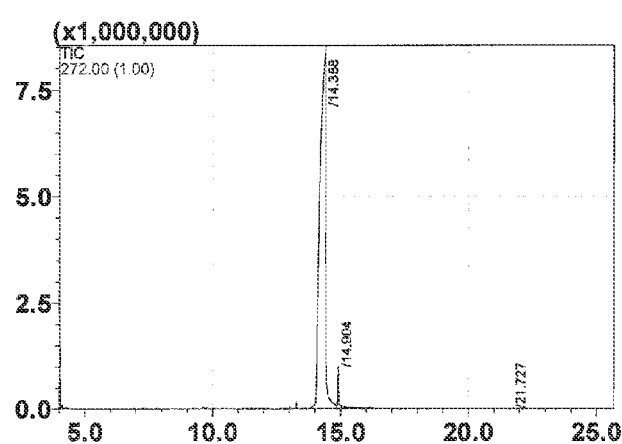
FIG. 10A shows a GC spectrum for the reaction products after about 1 hour at about 35° C. of Example 16.
Figure 10C:
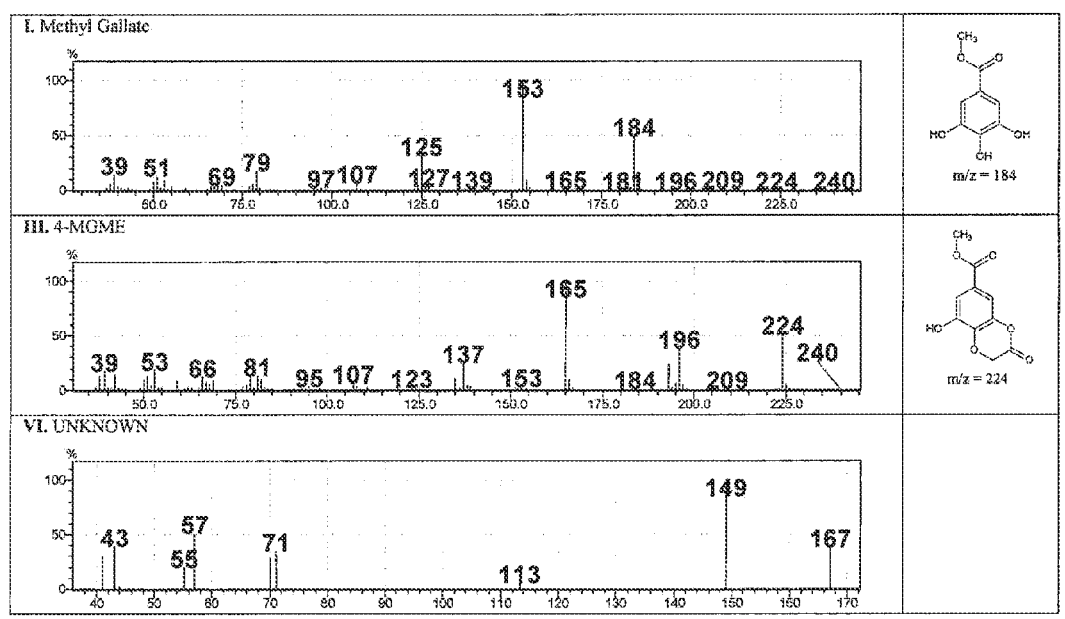
FIG. 10C shows a GC/MS spectrum for the reaction products of Example 16.

FIG. 10A shows a GC spectrum for the reaction products after about 1 hour at about 35° C. of this Example 16. FIG. 10B shows the reaction products for this Example 16. FIG. 10C shows a GC/MS spectrum for the reaction products of this Example 16.

Figure 10D:
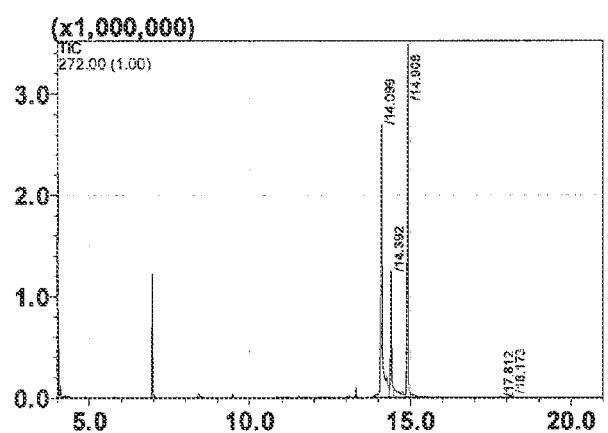
FIG. 10D shows a GC spectrum for the reaction products of Example 16 after about 1 hour at about 35° C. and then after a second hour at 55-70° C.
Figure 10F:
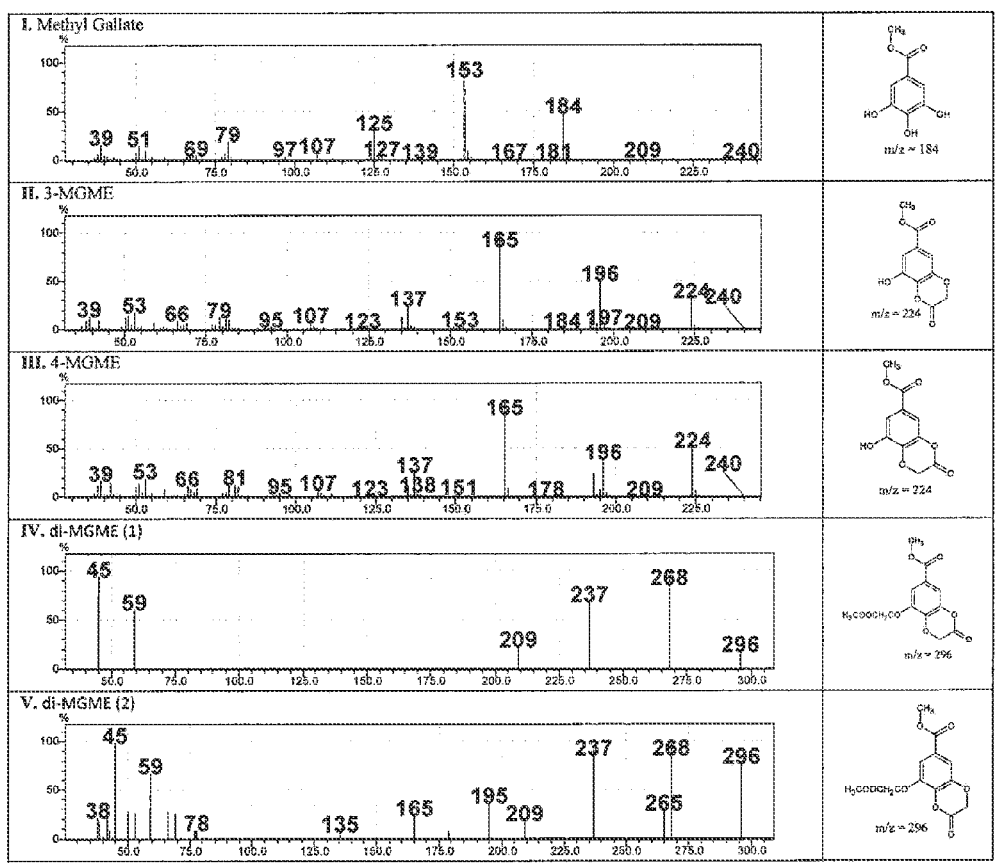
FIG. 10F shows a GC/MS spectrum for the reaction products for the embodiment of FIG. 10D of Example 16.

FIG. 10D shows a GC spectrum for the reaction products after about 1 hour at about 35° C. and then after a second hour at 55-70° C. FIG. 10E shows the reaction products for this embodiment of Example 16. FIG. 10F shows a GC/MS spectrum for the reaction products for this embodiment of Example 16.

Figure 10G:
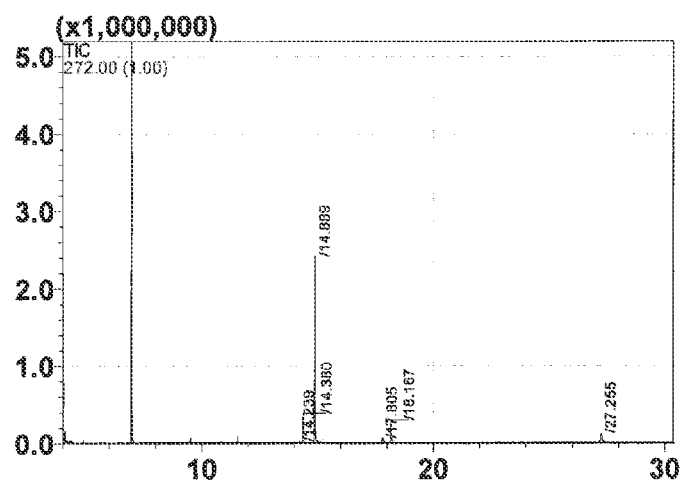
FIG. 10G shows a GC spectrum for the reaction products of Example 16 after about 1 hour at about 35° C. and then a second hour at 55-70° C., and held overnight at 55° C.
Figure 10I:
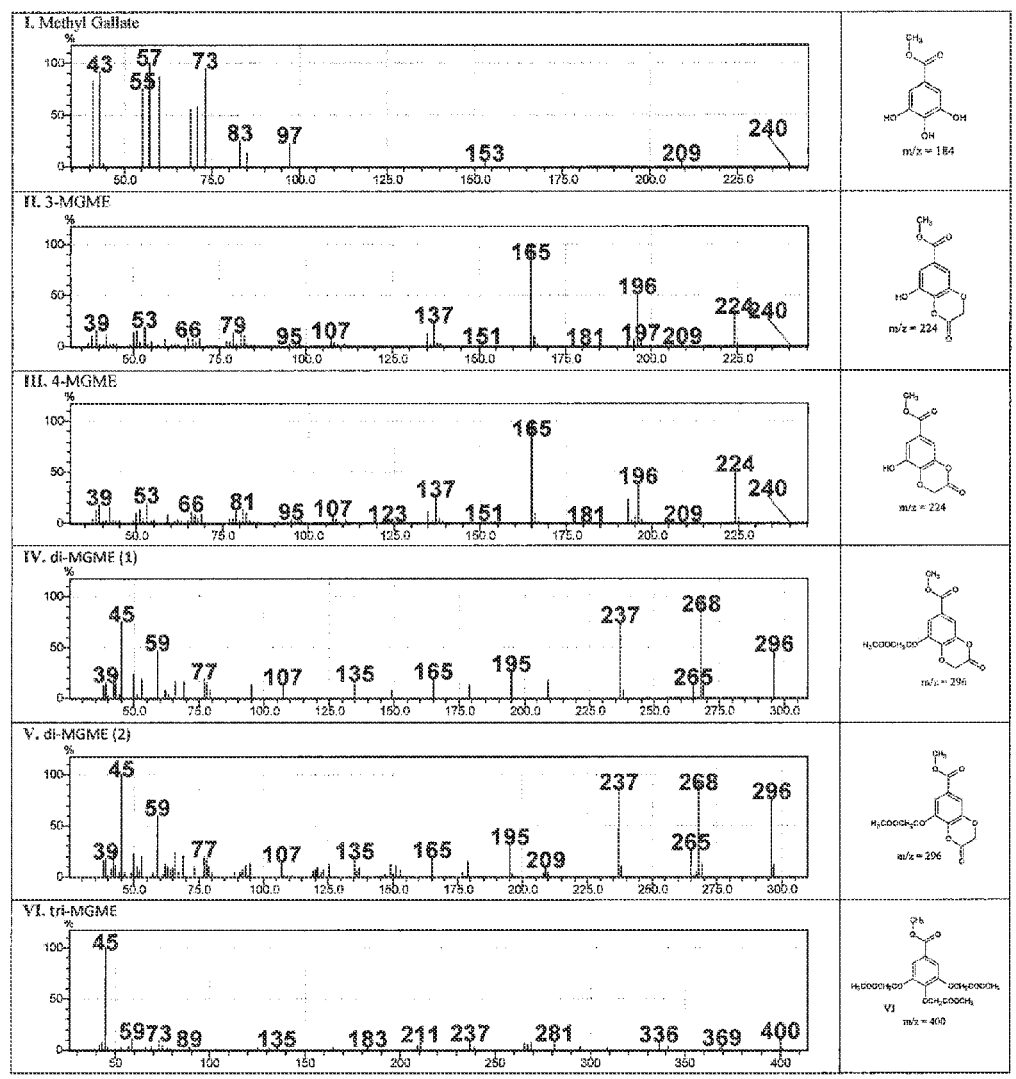
FIG. 10I shows a GC/MS spectrum for the reaction products for the embodiment of FIG. 10G of Example 16.

FIG. 10G shows a GC spectrum for the reaction products after about 1 hour at about 35° C. and then a second hour at 55-70° C., and held overnight at 55° C. FIG. 10H shows the reaction products for this embodiment of Example 16. FIG. 10I shows a GC/MS spectrum for the reaction products for this embodiment of Example 16.

Figure 10J:
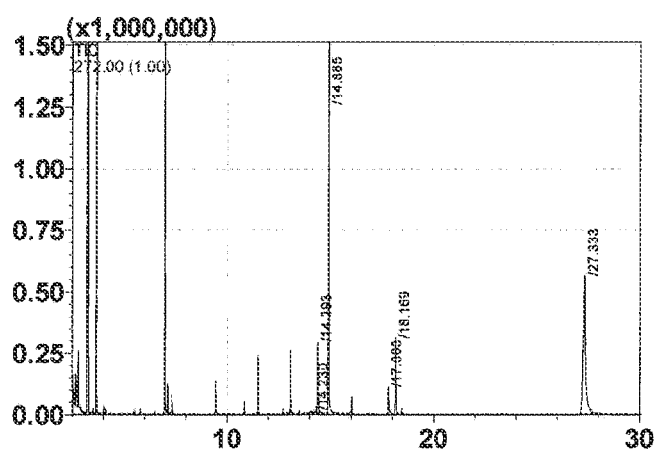
FIG. 10J shows a GC spectrum for the reaction products of Example 16 extracted from hexanes.
Figure 10L:
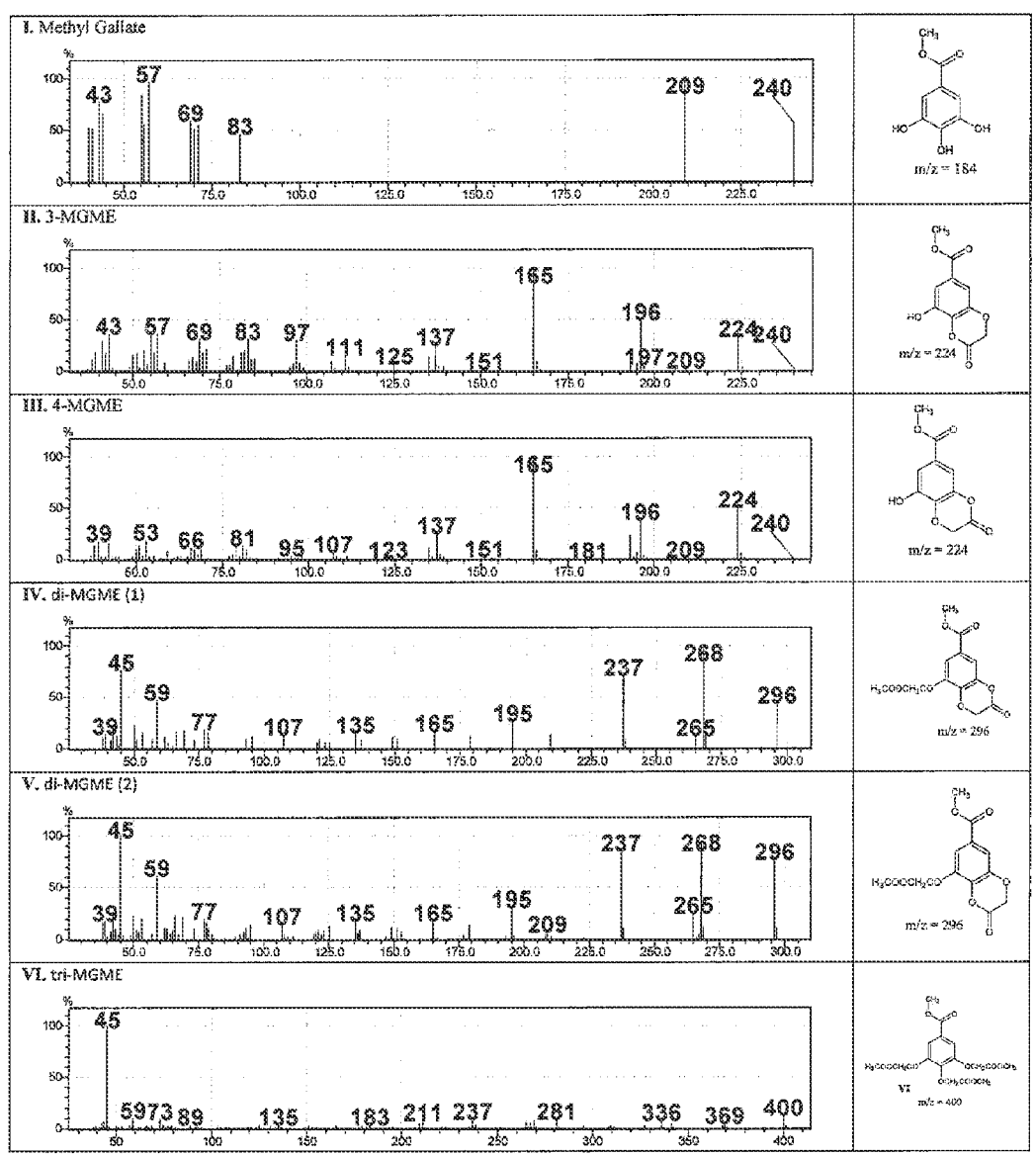
FIG. 10L shows a GC/MS spectrum for the reaction products for the embodiment of FIG. 10J of Example 16.

FIG. 10J shows a GC spectrum for the reaction products extracted from hexanes. FIG. 10K shows the reaction products for this embodiment of Example 16. FIG. 10L shows a GC/MS spectrum for the reaction products for this embodiment of Example 16.

Example 17

In a 100 mL round bottom flask, the following was added: 7.35 g of methyl gallate (39.9 mmol), 6.45 g of potassium carbonate (46.7 mmol), 4.79 g of methyl chloroacetate (44.1 mmol) and 11.81 g of ethyl acetate (134 mmol). The solution was heated at about 50° C., as determined with an IR temperature gun, over a period of two days for a total of 8 hours (quenched at overnight). The sample was checked by GC-MS at 1, 2, 5 and 8 hours; however, most of the runs produced peaks which were too weak or had too much noise for analysis. This report shows the results from the 1 and 8 hour samplings. The GC-MS results indicate the near complete consumption of methyl gallate after only 1 hour. It also indicates the formation of a large amount of the tri-substituted MGME after 8 hours (55% by peak area). Only a 1.11 molar excess of methyl chloroacetate was used in the reaction, so this should not be possible. Perhaps the tri-substituted product results in a stronger signal on the GC-MS.

Figure 11A:
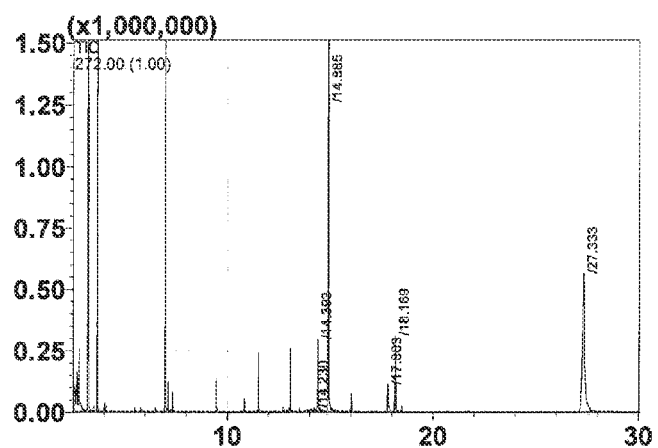
FIG. 11A shows a GC spectrum for the reaction products of Example 17 after heating at about 50° C. for about one hour.
Figure 11C:
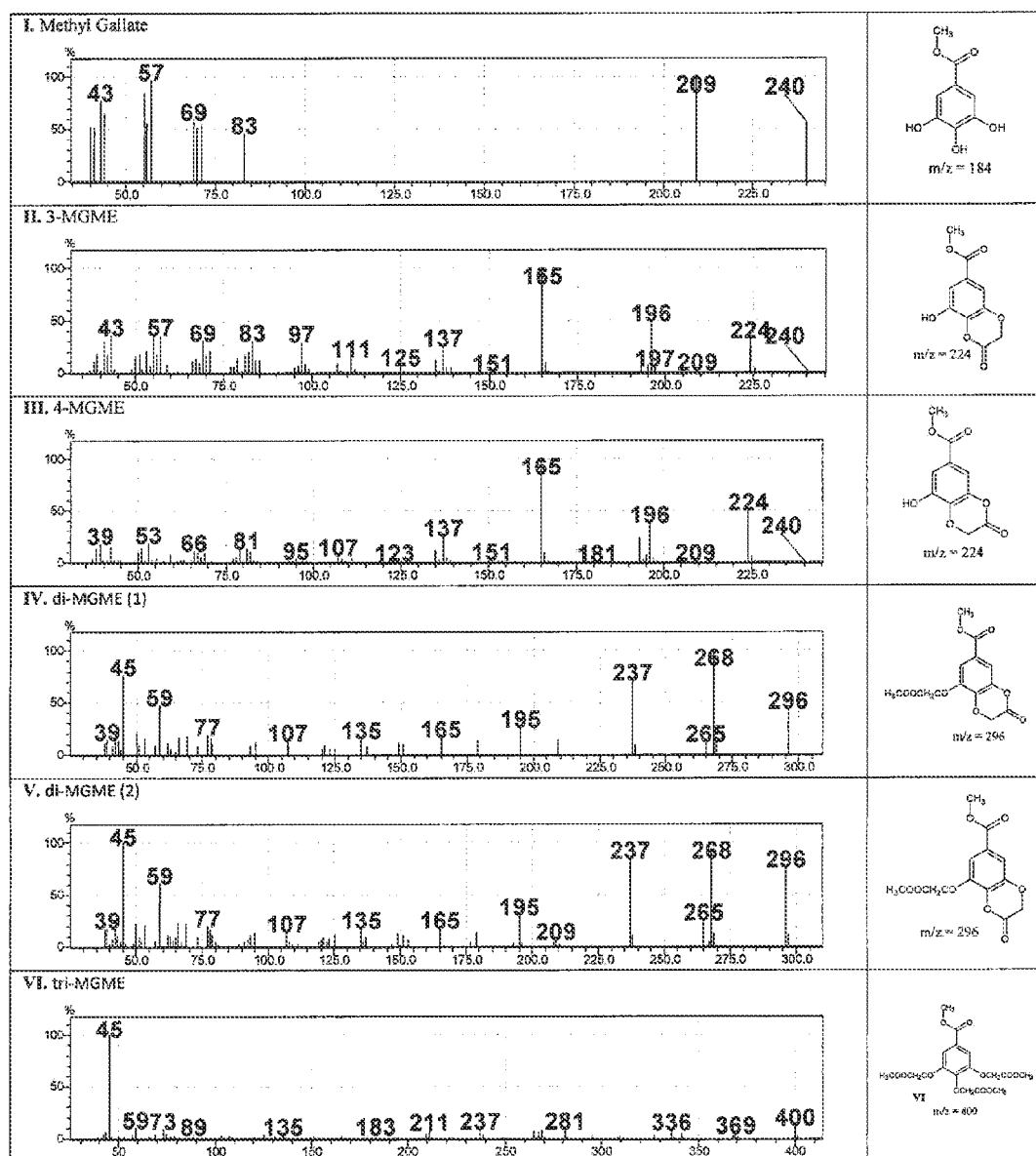
FIG. 11C shows a GC/MS spectrum for the reaction products for Example 17.

FIG. 11A shows a GC spectrum for the reaction products of Example 17 after heating at about 50° C. for about one hour. FIG. 11B shows the reaction products for this embodiment of Example 17. FIG. 11C shows a GC/MS spectrum for the reaction products for this embodiment of Example 17.

Figure 11D:
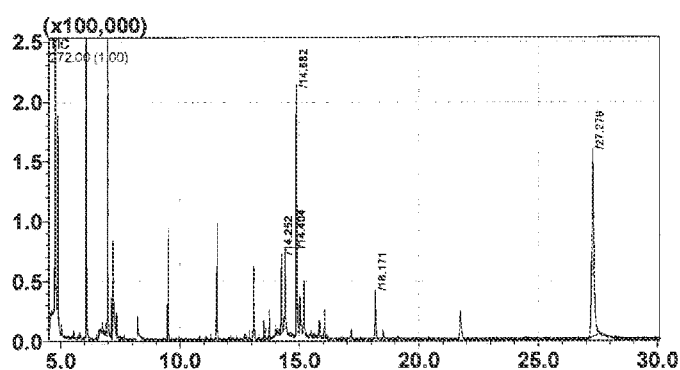
FIG. 11D shows a GC spectrum for the reaction products of Example 17 after heating at about 50° C. for about eight hours.
Figure 11F:
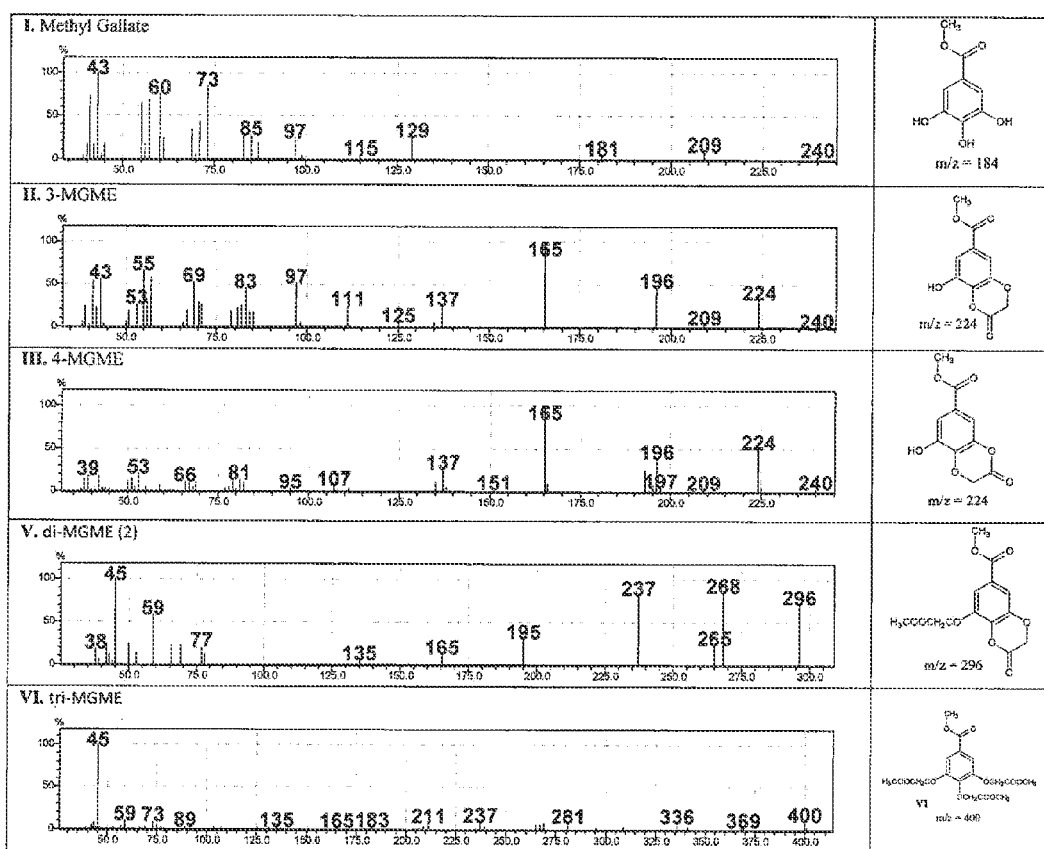
FIG. 11F shows a GC/MS spectrum for the reaction products for the embodiment of FIG. 11D of Example 17.

FIG. 11D shows a GC spectrum for the reaction products after heating at about 50° C. for about eight hours. FIG. 11E shows the reaction products for this embodiment of Example 17. FIG. 11F shows a GC/MS spectrum for the reaction products for this embodiment of Example 17.

Analysis of Concentration and Temperature of Unprotected MGME Reaction

Reactions were run to examine the effects of concentration and temperature on the unprotected MGME product(s). As shown below, five products are possible. Two of the reactions were run with a 5.11 molar excess of methyl chloroacetate in comparison to the methyl gallate. The other three reactions were run with a 14.13 molar excess of methyl chloroacetate. All of the reactions were run neat with the methyl chloroacetate acting as the solvent.

In each reaction, 0.054 moles of methyl gallate was used along with 0.060 moles of potassium carbonate. Two reactions were performed at room temperature. Two of the reactions were run at 40° C. A final reaction was run at 80° C.

A total of five products could be formed as shown in Reaction Scheme II:

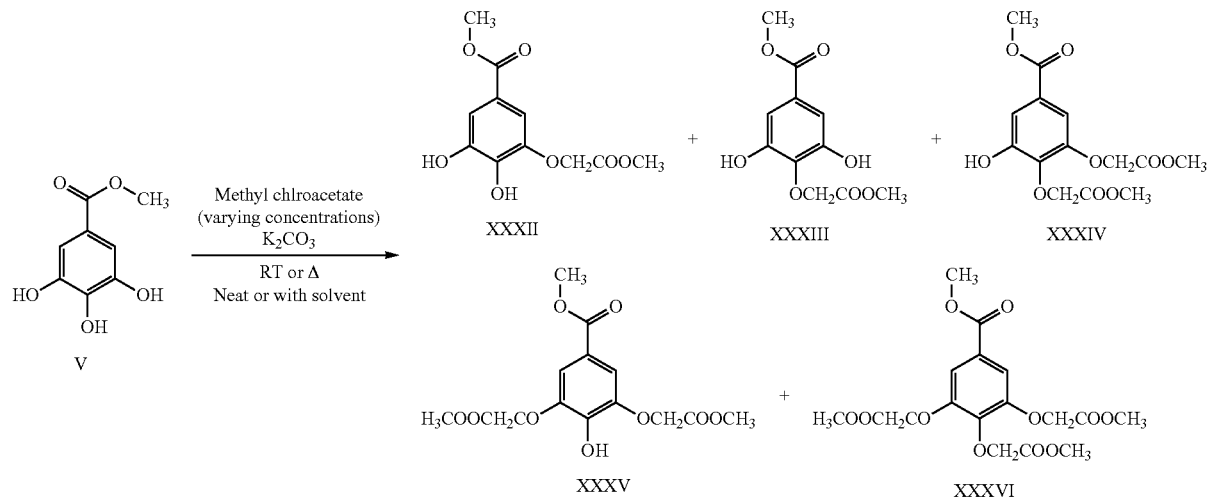

The progress of the reactions was periodically monitored by GC-MS. Small samples were withdrawn from the reaction vessels, about 1 mL of a 50/50 mixture of ethyl acetate and acetone (by weight) was added and they were then filtered through a Pasteur pipette (which had a cotton plug and ~1 cm thick plug of silica gel) prior to injecting into the GC-MS.

Figure 1:
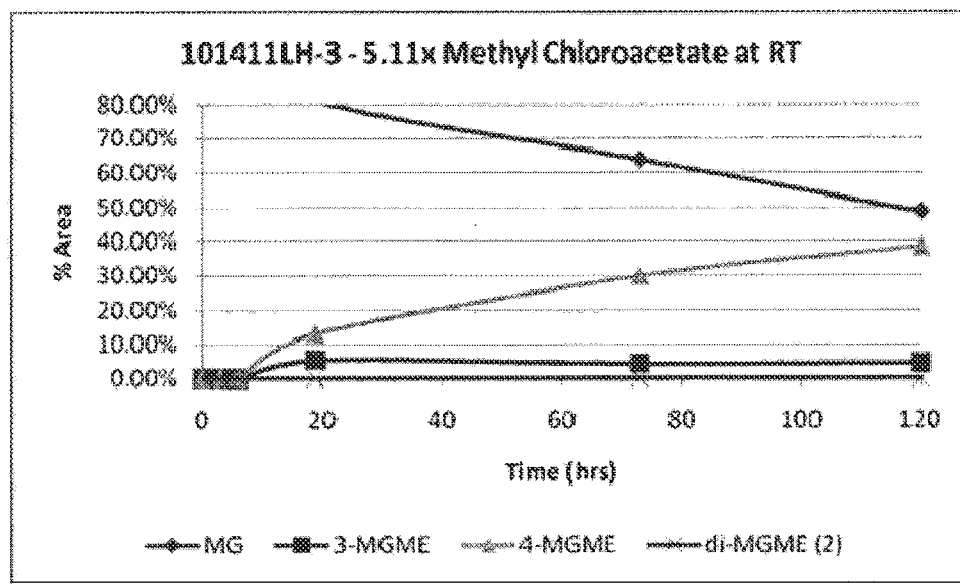
FIG. 1 graphically shows the reaction of methyl gallate and a 5 fold excess of methyl chloroacetate at room temperature.

Table 2 recites the reaction products for a reaction between methyl gallate and about a five (5) fold excess of methyl chloroacetate at room temperature at various reaction times. No solvent was utilized. FIG. 1 graphically depicts the data of Table 2.

TABLE 2

| 5.11 Fold Excess Of Methyl Chloroacetate At Room Temperature | | | | | | |
|---|---|---|---|---|---|---|
| | % of total Peak Area | | | | | |
| Time (hrs) | 0 | 3 | 6 | 19 | 73 | 120 |
| Methyl Gallate | 100.00% | 99.79% | 99.65% | 81.28% | 64.05% | 48.79% |
| 3-MGME | — | — | — | 5.30% | 4.21% | 4.45% |
| 4-MGME | — | 0.21% | 0.35% | 13.20% | 29.88% | 38.64% |

TABLE 2-continued

| 5.11 Fold Excess Of Methyl Chloroacetate At Room Temperature | | | | | | |
|---|---|---|---|---|---|---|
| | % of total Peak Area | | | | | |
| Time (hrs) | 0 | 3 | 6 | 19 | 73 | 120 |
| di-MGME (1)* | — | — | — | — | — | — |
| di-MGME (2)* | — | — | — | 0.23% | 1.86% | 18.12% |
| tri-MGME | — | — | — | — | — | — |

Figure 2:
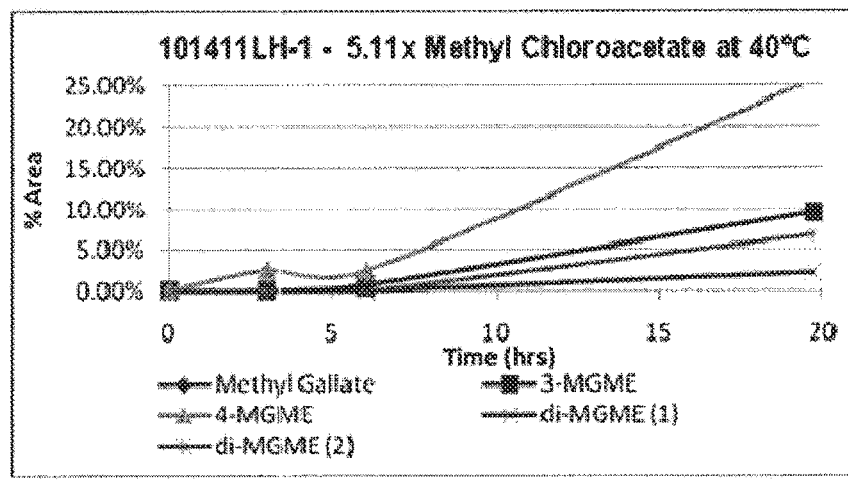
FIG. 2 graphically shows the reaction of methyl gallate and a 5 fold excess of methyl chloroacetate at 40° C.

Table 3 recites the reaction products for a reaction between methyl gallate and about a five (5) fold excess of methyl chloroacetate at 40° C. at various reaction times. No solvent was utilized. FIG. 2 graphically depicts the data of Table 3.

TABLE 3

| 5.11 Fold Excess Of Methyl Chloroacetate at 40° C. | | | | | | |
|---|---|---|---|---|---|---|
| | % of total Peak Area | | | | | |
| Time | 0 | 4 | 8 | 24 | 48 | 76 |
| Methyl Gallate | 100.00% | 99.32% | 98.64% | 59.73% | 17.69% | 3.08% |
| 3-MGME | 0.00% | 0.00% | 0.00% | 5.21% | 6.12% | 5.08% |
| 4-MGME | 0.00% | 0.68% | 1.31% | 27.16% | 47.48% | 29.21% |
| di-MGME (1)* | 0.00% | 0.00% | 0.02% | 4.38% | 6.44% | 17.49% |
| di-MGME (2)* | 0.00% | 0.00% | 0.03% | 3.06% | 12.90% | 24.19% |
| tri-MGME | 0.00% | 0.00% | 0.00% | 0.46% | 9.37% | 20.23% |

Figure 3:
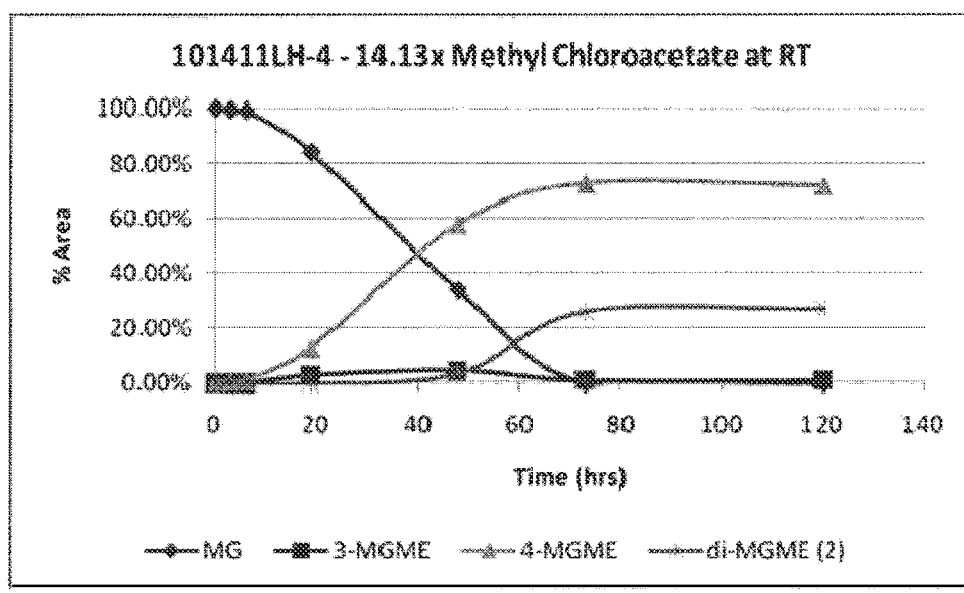
FIG. 3 graphically shows the reaction of methyl gallate and a 14 fold excess of methyl chloroacetate at room temperature.

Table 4 recites the reaction products for a reaction between methyl gallate and about a fourteen (14) fold excess of methyl chloroacetate at room temperature at various reaction times. No solvent was utilized. FIG. 3 graphically depicts the data of Table 4.

TABLE 4

14.13 Fold Excess Of Methyl Chloroacetate at Room Temperature

% of total Peak Area

| Time (hrs) | 0 | 3 | 6 | 19 | 47.75 | 73 | 120 |
|---|---|---|---|---|---|---|---|
| Methyl Gallate | 100.00% | 99.48% | 99.10% | 84.15% | 34.19% | — | — |
| 3-MGME | — | — | — | 3.00% | 4.74% | 1.22% | 1.06% |
| 4-MGME | — | 0.52% | 0.89% | 12.85% | 57.60% | 72.68% | 71.83% |
| di-MGME (1)* | — | — | — | — | — | — | — |
| di-MGME (2)* | — | — | — | — | 3.47% | 26.10% | 27.11% |
| tri-MGME | — | — | — | — | — | — | — |

Figure 4:
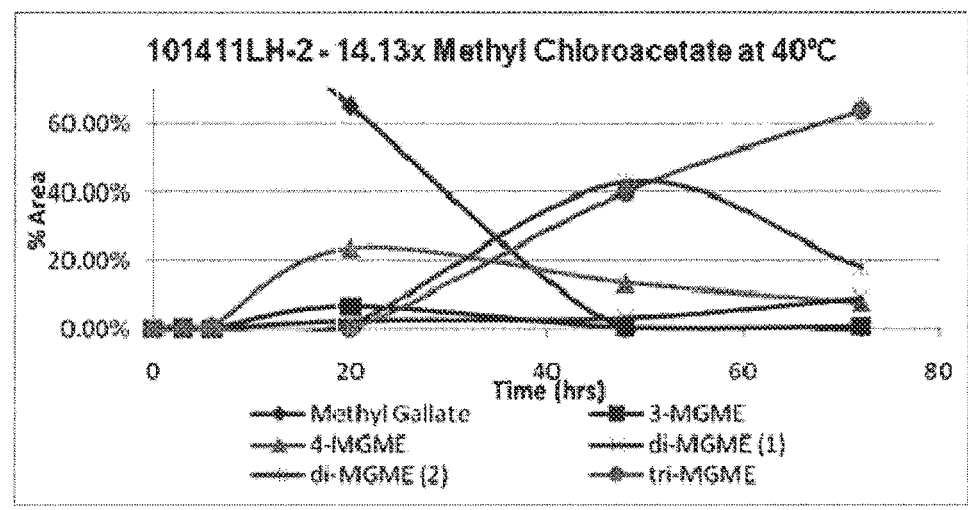
FIG. 4 graphically shows the reaction of methyl gallate and a 14 fold excess of methyl chloroacetate at 40° C.

Table 5 recites the reaction products for a reaction between methyl gallate and about a fourteen (14) fold excess of methyl chloroacetate at 40° C. at various reaction times. No solvent was utilized. FIG. 4 graphically depicts the data of Table 5.

TABLE 5

14.13 Fold Excess Of Methyl Chloroacetate at 40° C.

% of total Peak Area

| Time (hrs) | 0 | 3 | 6 | 20 | 48 | 72 |
|---|---|---|---|---|---|---|
| Methyl Gallate | 100.00% | 98.73% | 98.87% | 65.29% | — | 0.07% |
| 3-MGME | — | 0.16% | — | 6.68% | 0.30% | 0.66% |
| 4-MGME | — | 1.11% | 1.13% | 23.82% | 13.51% | 7.78% |
| di-MGME (1)* | — | — | — | 2.39% | 3.23% | 9.28% |
| di-MGME (2)* | — | — | — | 1.82% | 42.88% | 18.20% |
| tri-MGME | — | — | — | — | 40.08% | 64.01% |

Figure 5:
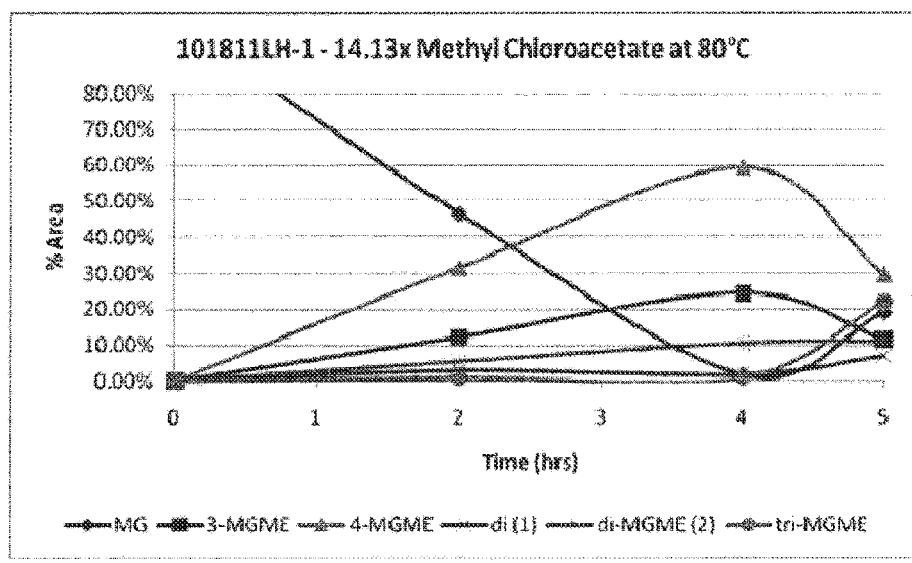
FIG. 5 graphically shows the reaction of methyl gallate and a 14 fold excess of methyl chloroacetate at 80° C.

Table 6 recites the reaction products for a reaction between methyl gallate and about a fourteen (14) fold excess of methyl chloroacetate at 80° C. at various reaction times. No solvent was utilized. FIG. 5 graphically depicts the data of Table 6.

TABLE 6

14.13 Fold Excess Of Methyl Chloroacetate at 80° C.
% of total Peak Area

| Time (hrs) | 0 | 2 | 4 | 5 |
|---|---|---|---|---|
| Methyl Gallate | 100.00% | 46.50% | 1.72% | 18.95% |
| 3-MGME | — | 12.30% | 24.41% | 11.56% |
| 4-MGME | — | 31.70% | 59.48% | 29.71% |
| di-MGME (1)* | — | 2.98% | 1.86% | 6.97% |
| di-MGME (2)* | — | 5.51% | 10.55% | 10.96% |
| tri-MGME | — | 1.01% | 1.01% | 21.85% |

While the preferred embodiments of the present invention have been illustrated in detail, it should be apparent that modifications and adaptations to those embodiments may occur to one skilled in the art without departing from the scope of the present invention.

I claim:
1. A polishing composition, comprising:
a compound having structure I or salts thereof:

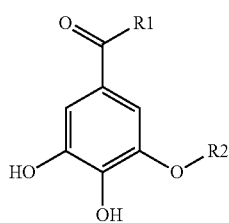

wherein R1 is selected from the group consisting of —O⁻M^{x+} wherein x is selected from the group consisting of 1, 2, and 3, —O—R3 wherein R3 is selected from the group consisting of alkyl, allyl, and phenyl, —N(R3R4) wherein R4 is selected from the group consisting of —H, alkyl, allyl, and phenyl, and —S—R3, and wherein R2 is selected from the group consisting of —CH$_2$—CO$_2$—CH$_3$, —CO—NH—R5, —CH$_2$—CH(OH)—CH$_2$—OH, —CH$_2$—CH(OH)—CH$_2$—R3, and —CH$_2$-substituted phenyl, wherein R5 is selected from the group consisting of alkyl and substituted phenyl.

2. The polishing composition of claim 1, further comprising:
a fluid;
wherein said compound is present in an amount between about 0.5 weight percent and about 30 weight percent.

3. The polishing composition of claim 2, wherein said fluid comprises water.

4. The polishing composition of claim 3, wherein said fluid further comprises ethylene glycol.

5. The polishing composition of claim 1, wherein R2 comprises the structure:

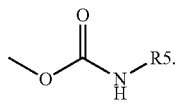

6. The polishing composition of claim 1, wherein:
R1 is —O—C$_{12}$H$_{25}$;
R2 is —CH$_2$—CO—O—CH$_3$.

7. The polishing composition of claim 1, wherein O—R2 comprises the structure:

8. The polishing composition of claim 1, wherein O—R2 comprises the structure:

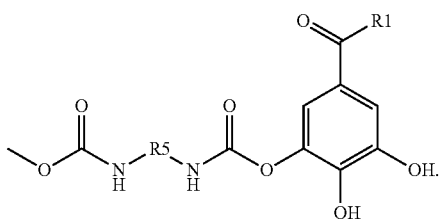

9. The polishing composition of claim 1, comprises the structure:

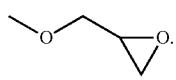

10. The polishing composition of claim 1, wherein O—R2 comprises the structure:

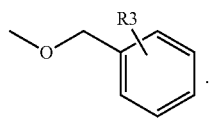

11. The polishing composition of claim 1, wherein O—R2 comprises the structure:

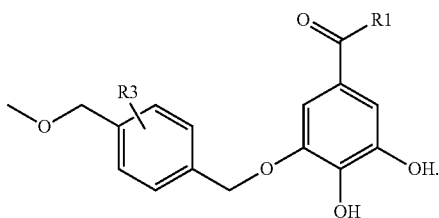

12. The polishing composition of claim 1, wherein O—R2 comprises the structure:

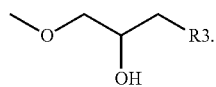

13. A polishing composition formed by the process of:
forming a mixture consisting of methyl chloroacetate, potassium carbonate, and a compound I:

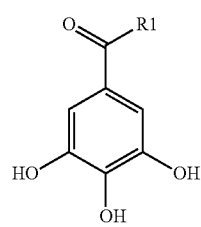

wherein R1 is selected from the group consisting of —O$^-$M$^{x+}$ wherein x is selected from the group consisting of 1, 2, and 3, —O—R3 wherein R3 is selected from the group consisting of alkyl, allyl, and phenyl, —N(R3R4) wherein R4 is selected from the group consisting of —H, alkyl, allyl, and phenyl, and —S—R3.

14. The polishing composition of claim 13, wherein said mixture comprises about a 5 fold excess of methyl chloroacetate with respect to compound I.

15. The polishing composition of claim 14, wherein said mixture is maintained at room temperature.

16. The polishing composition of claim 14, wherein said mixture is heated to about 40° C.

17. The polishing composition of claim 14, wherein said mixture is heated to about 80° C.

18. The polishing composition of claim 13, wherein said mixture comprises about a 14 fold excess of methyl chloroacetate with respect to compound I.

19. The polishing composition of claim 18, wherein said mixture is maintained at room temperature.

20. The polishing composition of claim 18, wherein said mixture is heated to about 40° C.

21. The polishing composition of claim 14, wherein said mixture is heated to about 80° C.

* * * * *